(12) United States Patent
Sasa

(10) Patent No.: US 7,085,429 B2
(45) Date of Patent: Aug. 1, 2006

(54) BINARIZATION DEVICE

(75) Inventor: Noboru Sasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 853 days.

(21) Appl. No.: 10/241,790

(22) Filed: Sep. 12, 2002

(65) Prior Publication Data

US 2003/0048726 A1    Mar. 13, 2003

(30) Foreign Application Priority Data

Sep. 13, 2001    (JP)    ............................. 2001-278518

(51) Int. Cl.
*G06K 9/38*    (2006.01)
*G11B 7/095*   (2006.01)

(52) U.S. Cl. .................. 382/272; 382/270; 369/59.17; 369/59.12

(58) Field of Classification Search ................ 382/272, 382/270, 273, 274; 369/59.12, 59.17, 47.52, 369/44.32
See application file for complete search history.

(56) References Cited

U.S. PATENT DOCUMENTS

| | | | |
|---|---|---|---|
| 5,347,505 A * | 9/1994 | Moritsugu et al. ........ | 369/59.12 |
| 5,625,718 A * | 4/1997 | Kaji et al. .................... | 382/274 |
| 5,677,025 A | 10/1997 | Tomura et al. | |
| 5,863,703 A | 1/1999 | Tomura et al. | |
| 5,898,654 A * | 4/1999 | Shimada et al. .......... | 369/44.32 |
| 5,915,049 A * | 6/1999 | Kaji et al. ................... | 382/273 |
| 5,939,163 A | 8/1999 | Ueno et al. | |
| 5,998,093 A | 12/1999 | Tomura et al. | |
| 6,057,020 A | 5/2000 | Ueno et al. | |
| 6,169,716 B1 | 1/2001 | Buchler | |
| 6,197,477 B1 | 3/2001 | Satoh et al. | |
| 6,225,022 B1 | 5/2001 | Tomura et al. | |
| 6,366,631 B1 | 4/2002 | Nakayama et al. | |
| 6,535,468 B1 * | 3/2003 | Akiyama et al. ......... | 369/47.52 |
| 6,564,009 B1 * | 5/2003 | Owa et al. ................... | 386/126 |
| 6,894,965 B1 * | 5/2005 | Furumiya et al. ......... | 369/59.12 |
| 2001/0044001 A1 | 11/2001 | Noguchi et al. | |
| 2002/0048646 A1 | 4/2002 | Tomura et al. | |

FOREIGN PATENT DOCUMENTS

| | | |
|---|---|---|
| EP | 0 753 850 | 1/1997 |
| EP | 1 003 168 | 5/2000 |
| JP | 5-334802 | 12/1993 |
| JP | 09198798 | 7/1997 |
| JP | 11-183325 | 7/1999 |

(Continued)

*Primary Examiner*—Sanjiv Shah
(74) *Attorney, Agent, or Firm*—Dickstein Shapiro Morin & Oshinsky LLP

(57) ABSTRACT

The present invention provides a binarization device that realizes reproduction with a low error rate, even where optimum recording conditions such as recording power have not been set in the recording device, or where optimum recording has not been carried out for the reproducing device. The binarization device includes a binarization unit, a slice level setting unit, and a weight adding function. The binarization unit binarizes a reproduction signal obtained by reproducing information recorded by mark length recording on a recording medium to output high-level signals and low-level signals based on a slice level. The slice level setting unit calculates the average value of the high-level signals output from the binarization unit, and determines the slice level from the average value. The determined slice level is set to the binarization unit. Either the binarization unit or the slice level setting unit adds a predetermined weight to each signal having a short high-level time among the high-level signals.

9 Claims, 25 Drawing Sheets

FOREIGN PATENT DOCUMENTS

| | | |
|---|---|---|
| JP | 11-185387 | 7/1999 |
| JP | 11-259986 | 9/1999 |
| JP | 2000-339863 | 12/2000 |
| WO | WO 98/24187 | 6/1998 |

* cited by examiner (a) RECORDING FREQUENCY 0.9 (MHz)

(b) RECORDING FREQUENCY 2.2 (MHz)

(c) RECORDING FREQUENCY 3.2 (MHz)

PRIOR ART

US 7,085,429 B2

BINARIZATION DEVICE

BACKGROUND OF THE INVENTION

1. Field of the Invention

The present invention relates to a binariation device such as an auto slice circuit that recovers original binary data consisting of digital signals from reproduction signals (high-frequency signals) obtained by reading digital signals from a recording medium such as a magnetic recording medium, an optical recording medium, or an magneto-optical recording medium.

2. Description of the Related Art

In reproduction devices for optical recording media such as compact disks (CDs) and digital video disks (DVDs), binarization devices have conventionally been employed to recover original data from reproduction signals of the recording media.

FIG. 34 shows the structure of an auto slice circuit that is an example of a conventional binarization device.

In this auto slice circuit, a binarization unit 10 binarizes an input signal. Based on the binary signal from the binarization unit 10, a slice level setting unit 11 sets a slice level signal, and returns the slice level signal to the binarization unit 10. The binarization unit 10 then compares the sizes of the returned slice level signal and the input signal to carry out a binarization process.

In the following, the conventional auto slice circuit will be described in greater detail.

FIG. 35 is a circuit diagram showing an example of the internal structure of the slice level setting unit 11 of the auto slice circuit shown in FIG. 34.

The slice level setting unit 11 includes an integrator 12 and a subtractor 13. An input signal is input into the binarization unit 10, and the output of the binarization unit 10 is input into the integrator 12. The subtractor 13 carries out a subtraction process between a DC offset signal and the output signal of the integrator 12. The result of the subtraction process is returned as the slice level signal to the binarization unit 10.

Next, the operation of the conventional auto slice circuit shown in FIG. 35 will be described in greater detail.

FIGS. 36A through 36E are waveform charts showing the waveforms of input signals and output signals of each part of the auto slice circuit of FIG. 35. FIG. 36A is a waveform chart of the input signal to be input into the binarization unit 10. FIG. 36B is a waveform chart of the binary signal to be output from the binarization unit 10. FIG. 36C is a waveform chart of the integral signal to be output from the integrator 12. FIG. 36D is a waveform chart of the slice level signal to be output from the subtractor 13. FIG. 36E is a waveform chart of the input signal and the slice level signal to be input into the binarization unit 10.

An input signal of the waveform shown in FIG. 36A is input into the binarization unit 10. Assuming that the slice level signal of the binarization unit 10 is initially 0(V), the binarization unit 10 compares the input signal with the slice level signal of 0(V). If the input signal is greater than 0(V), the binarization unit 10 outputs such a binary signal that the output voltage becomes 0(V). If the input signal is smaller than 0(V), the binarization unit 10 outputs such a binary signal that the output voltage becomes VR (+5(V), for example), as shown in FIG. 36B.

From a recording medium, a signal to lower the voltage of a recording area (or a mark part) relative to the voltage of a non-recording area (or a space part) is obtained. Assuming that a signal obtained by reversing the polarity of the above signal is used as an input signal for the auto slice circuit, the determination on the input signal shown in FIG. 36A based on the slice level signal (the slice level is assumed to be 0(V)) shows that the space length is smaller than the mark length.

The integrator 12 averages the binary signal of the waveform shown in FIG. 36B to obtain the integral signal of voltage V1 shown in FIG. 36C. The subtractor 13 then carries out a subtraction process between the integral signal of voltage V1 and a DC offset signal obtained by halving the high-level voltage VR (assumed to be 5(V), for example) of the binary signal, to obtain such a slice level signal as to make V0 equal to "VR/2−V1". Here, the DC offset signal can be generally expressed as "(low-level voltage)+[(high-level voltage)−(low-level voltage)]/2".

The slice level signal is returned to the binarization unit 10, which then compares the input signal with the voltage V0. If the input signal is greater than V0, the binarization unit 10 outputs a binary signal of 0(V). If the input signal is smaller than V0, the binarization unit 10 outputs a binary signal of +5(V).

By this returning operation, the slice level signal is set so that the space length becomes equal to the mark length with respect to the input signal as shown in FIG. 36E, and the original data are then determined from the reproduction signal of the recording medium, i.e., the reproduction signal is binarized.

When information is recorded on an optical recording medium such as an optical dick, an operation called "calibration" is normally carried out. The "calibration" includes the steps of test writing prior to the actual signal recording, checking the signal quality of the test writing, and thereby obtaining an optimum strength for the laser beam for recording. An optical recording medium such as a CD or a DVD has an area for the test writing on the innermost periphery of the disk. This area is called a "power calibration area (PCA)", and the series of pre-recording operations is called an "optimum power control (OPC)" operation.

An example of the OPC is carried out as follows.

First, a test signal is recorded in the PCA, with the laser beam strength being varied stepwise or continuously. The recorded part is then reproduced, and the location of the optimally recorded part is determined from the HF signal quality. The strength of the laser beam with which the test signal has been recorded at the optimally recorded location is then set as the optimum laser beam strength for recording. The quality check of the reproduction HF signal is carried out by detecting the asymmetry of the HF signal.

FIG. 37 is a block diagram showing the structure of a conventional circuit that detects the asymmetry of a reproduction signal obtained by reproducing a test signal recorded with varied recording power, and determines the optimum recording power from the asymmetry. FIG. 38 is a waveform chart of the output signal of a high-pass filter 20 of the circuit shown in FIG. 37.

A test signal is normally recorded on an optical disk, with the recording power being gradually varied. The area in which the test signal is recorded is irradiated with a reproduction beam, and the reflection beam is detected. As shown in FIG. 37, the high-pass filter 20 cuts off the direct current component of the HF signal obtained as a light reception signal from the detected reflection light. As a result, a signal of the waveform shown in FIG. 38 is obtained.

A top peak detecting circuit 21 and a bottom peak detecting circuit 22 respectively perform an analog operation to detect the top peak (the peak on the plus(+) side) At and the bottom peak (the peak on the minus(−) side) Ab of the HF signal of each recording power.

An asymmetry calculation circuit 23 calculates the asymmetry β of the HF signal of each recording power from the following formula: β=(At+Ab)/(At−Ab).

A determination circuit 24 selects the recording power with which the closest asymmetry to the optimum asymmetry among the asymmetries β is obtained, and determines the selected strength for recording power to be the optimum recording power. By carrying out the actual recording with this optimum recording power, an excellent reproduction signal quality can be obtained.

The optimum recording power for the recording medium is determined by carrying out the OPC in the above described manner. However, optimum recording is not always guaranteed by this conventional manner for the following reasons. First, the variation pitch of the recording power set for the test recording is generally in the range of 0.5 to 1.0 mw, which is too large. Second, there are changes in the recording power and wavelength in an actual recording operation. Third, the recording sensitivity and characteristics vary with recording locations. Finally, if not properly chosen, some recording methods might adversely affect the recording result. This means that carrying out the OPC does not realize optimum recording, and only preferable recording conditions that can be selected within the recording device are selected.

More specifically, there is a problem with a recording medium having mark lengths recorded thereon. With such a recording medium, the jitter and the error rate dramatically changes with changes in recording power. Even if the recording power only slightly differs from the optimum recording power, the jitter and the error rate cannot satisfy the required standards. This problem is referred to as a "narrow recording power margin".

To solve the above problem, it is ideal to produce a circuit having a minutely designed structure. However, since there are numerous parameters to be controlled and those parameters strongly affect one another, it is very difficult for a recording device to automatically set the parameters for optimum recording.

Furthermore, a recording medium is not necessarily reproduced by the recording and reproducing device that carried out the recording on the recording medium. Even if optimum recording is carried out on the recording medium by the recording and reproducing device, there is no guarantee that the recorded data can be reproduced in an optimum condition by a reproducing device, because the characteristics of the pick-up head (PUH) of the reproducing device are not identical to the characteristics of the PUH of the recording and reproducing device that carried out the recording. Here, the characteristics of a PUH include the wavelength, the numerical aperture (NA) of the lens, the rim intensity, and the beam diameter.

Although the jitter is important as a part of the reproduction characteristics, the error rate should be considered to be more important. It is wrong to consider that the dependencies of the jitter and the error rate on the recording power are identical, and that the error rate becomes lowest with the recording power with which the jitter becomes smallest, because the amplitude centers of all the recording mark lengths do not match with one another with a certain recording power.

Although to restrain the jitter at the smallest level has been considered to be the most important factor for optimum recording, a recording condition in which the jitter becomes smallest does not guarantee optimum recording. Since the jitter is a value representing a shift from the center value in standard deviation, the jitter exhibits a very small value if there exists only a small amount of data of large shifts from the center value among a large amount of data of small shifts from the center value. For this reason, even a very small jitter is not necessarily desirable, unless the error rate is at its lowest or is very low.

In other words, as long as the error rate is very low, the jitter may have a great value. However, a jitter of a great value might lead to changes in characteristics of the recording and reproducing device and its environment, or to an increase in the error rate due to a long storage period. Therefore, it is necessary to maintain the jitter within a certain range.

SUMMARY OF THE INVENTION

A general object of the present invention is to provide a binarization device in which the above problems are eliminated.

A specific object of the present invention is to provide a binarization device that realizes excellent reproduction with a lower error rate, even where optimum recording conditions such as recording power have not been selected in the recording device, or where optimum recording has not been carried out for the reproducing device.

The above objects of the present invention are achieved by a binarization device that includes: a binarization unit that binarizes a reproduction signal obtained by reproducing information recorded by mark length recording on a recording medium to obtain high-level signals and low-level signals based on a slice level; a slice level setting unit that calculates the average value of the high-level signals output from the binarization unit, further calculates the slice level based on the average value, and sets the slice level to the binarization unit; and a weight adding means of adding a predetermined weight to each signal having a short high-level time among the high-level signals.

The above objects of the present invention are also achieved by a binarization device that includes: a binarization unit that binarizes a reproduction signal obtained by reproducing information recorded by mark length recording on a recording medium to output high-level signals that are above a slice level and low-level signals that are below the slice level, and further binarizes the reproduction signal to output low-level signals that are above the slice level and high-level signals that are below the slice level; a slice level setting unit that calculates the average value of the former high-level signals and the average value of the latter high-level signals, further calculates the average value of the former high-level signal average value and the latter high-level signal average value, determines the slice level from the last average value, and sets the slice level to the binarization unit; and a weight adding means of adding a predetermined weight to each signal having a short high-level time among all the high-level signals.

The above objects of the present invention are also achieved by a binarization device that includes: a binarization unit that binarizes a reproduction signal obtained by reproducing information recorded by mark length recording on a recording medium to output high-level signals that are above a slice level and low-level signals that are below the slice level, and further binarizes the reproduction signal to output low-level signals that are above the slice level and high-level signals that are below the slice level; a slice level setting unit that calculates the average value of the former high-level signals and the average value of the latter high-level signals output from the binarization unit, selects one of the two average values based on the condition of the reproduction signal, calculates the slice level from the selected average value, and sets the slice level to the binarization unit; and a weight adding means of adding a predetermined weight to each signal having a short high-level time among all the high-level signals.

In any of the above binarization devices, the weight adding means may serve to decrease the level value of each of the high-level signals with the lapse of output time.

In any of the above binarization devices, the weight adding means may serve to give a level value to each signal having a short high-level time in such a manner that the shorter high-level time a signal has, the greater level value the signal is given.

In any of the above binarization devices, a fluctuation of the slice level may be made greater than a fluctuation of the center value of amplitude of the second shortest mark length in the reproduction signal.

In any of the above binarization devices, the weight adding means may add a predetermined weight to each signal having a short high-level time, so that curves representing the recording mark length dependencies of the differences among mark lengths and space lengths recorded on the recording medium cross between the shortest mark length and the second shortest mark length.

Any of the above binarization devices may further include: an amplitude center value detecting unit that detects the amplitude center value of the shortest mark length in the reproduction signal; and a slice offset adding unit that adds a slice offset value to the slice level determined by the slice level setting unit, so that the slice level to be set to the binarization unit matches with the amplitude center value detected by the amplitude center value detecting unit.

In any of the above binarization devices, the recording medium may have physical change parts that are formed in two non-recording areas between which a track having the marks recorded thereon is located, with the center line of the track being the center line of the asymmetrical situation (location) of the physical change parts.

With any of the above binarization devices of the present invention, excellent reproduction can be realized with a low error rate, and an increase in the error rate with a fluctuation in recording power (or a change in recording condition) can be restrained, even where optimum recording conditions such as-the recording power have not been selected in the recording device, or where optimum recording has not been carried out for the reproducing device. Accordingly, the reliability in reproduction can be greatly increased.

As the reliability in reproduction is increased, the restrictions on the recording conditions can be relaxed to a great degree. Accordingly, workload on the recording device can be effectively reduced.

The above and other objects and features of the present invention will become more apparent from the following description taken in conjunction with the accompanying drawings.

DESCRIPTION OF THE PREFERRED EMBODIMENTS

Figure 1:
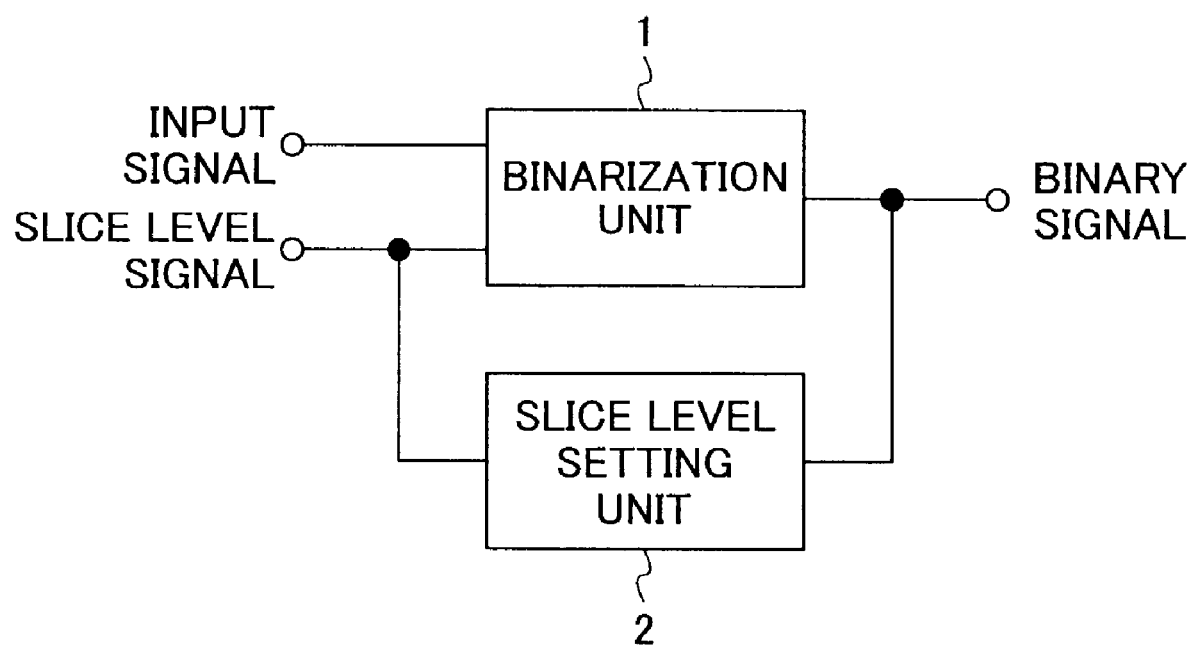
FIG. 1 is a block diagram showing the structure of an auto slice circuit that is an embodiment of a binarization device in accordance with the present invention.

The following is a description of embodiments of the present invention, with reference to the accompanying drawings.

The auto slice circuit of this embodiment achieves the following two objects.

1) Even if the recording is not in optimum condition, or even if the recording is not in optimum condition for the reproducing device with the jitter not showing a preferable value, the recorded data can be reproduced with a lower error rate.

2) Even if there is a change in the recording condition (such as a change of the recording power during the recording operation, the influence from a track offset, or the influence from unevenness of the thickness of a recording layer), changes in the jitter and the error rate due to the change in the recording condition can be reduced in the reproducing operation.

Relating to the auto slice circuit of this embodiment, a method for achieving the above two objects by increasing fluctuations (or margins) of the jitter and the error rate with a fluctuation of the recording power will be described below.

The jitter is greatly affected by a short mark that appears frequently and has a small dynamic range of amplitude with respect to a fluctuation of the slice level (i.e., a small degree of modulation). Accordingly, the jitter is substantially determined by the difference between the amplitude centers of the shortest mark and the second shortest mark. This means that the jitter becomes smallest with a recording power close to the recording power with which the amplitude centers of the shortest mark and the second shortest mark become the same.

The error rate is determined by the difference between the slice level and the shortest mark that appears frequently, has a wide fluctuation in the degree of modulation, and has a small dynamic range of amplitude with respect to a change of the slice level.

Since the jitter is determined by the fluctuation relative to the average value of all the marks, it is not possible to determine the jitter from the recording condition of only one recording mark length. It is therefore necessary to check the recording conditions of at least two recording mark lengths.

As for the error rate, the amount of difference between the center values is not a serious problem, but a difference in the binarization that will lead to a reproduction error is a problem. Here, the jitter does not have to be smallest. Accordingly, it is possible to determine the error rate from only the condition of the shortest mark that has a small dynamic range of amplitude with respect to a fluctuation of the slice level signal, and has greatly varied recording conditions.

In the above described conventional auto slice circuit, the slice level signal is set near the amplitude center of the average mark length by virtue of the returning operation of the auto slice circuit, where a signal transmitted from the binarization unit has a perfect square waveform consisting of a high level and a low level. In a case of a recording operation with mark length modulation, the average mark length is always longer than the shortest mark length. For example, with the 8–16 modulation used for DVDs, the average mark length is approximately 5T, and the shortest mark length is 3T. Accordingly, with the slice level signal that changes with the average mark length, the jitter and the error rate that are affected by the shortest mark greatly deteriorate, where the recording power shifts from the recording power value with which the jitter and the error rate become smallest or lowest.

To avoid such a problem, the auto slice circuit of this embodiment has the slice level signal closer to the center of the amplitude of the shortest mark, and makes the slice level signal automatically change with the amplitude fluctuation (or the formation variation) of the shortest mark. In this auto slice circuit, the slice level signal does not change with the center of the average amplitude of the shortest mark, but follows the amplitude fluctuation (or the fluctuation of the center of the amplitude) of the shortest mark.

For example, where the slice level signal is set at the center of the amplitude of the average mark length determined by a modulation method, a slice offset signal is added to the slice level signal to optimize it (i.e., to bring the slice level signal closer to the center of the amplitude of the shortest mark), so that the jitter and the error rate can be improved.

However, the above operation cannot sufficiently improve the jitter and the error rate. A short mark generally has a very wide variation in the formation state, and greatly changes in the degree of modulation and the amplitude center, due to the influence from problems including uneven thickness of a recording layer, eccentricity, a change of the shapes of grooves such as wobbles or land pre-pits, and track offset. To keep the jitter and the error rate low, it is necessary to change the slice level signal with those changes in the degree of modulation and the amplitude center to some degree.

Figure 4:
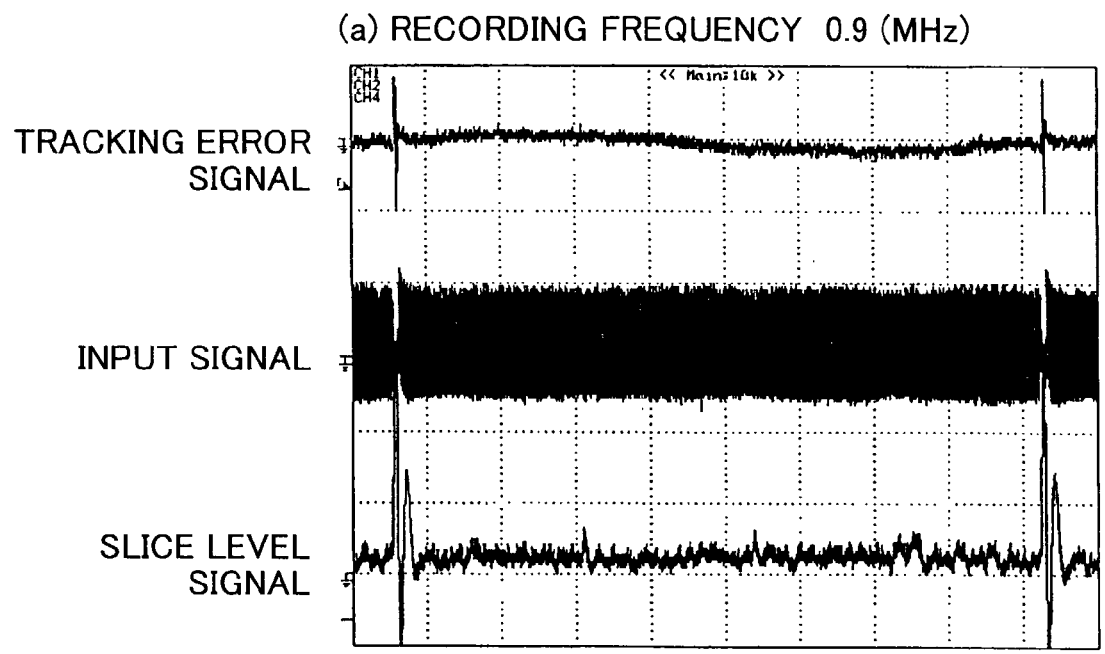
FIG. 4 is a waveform chart showing a fluctuation of the degree of modulation and a fluctuation of the slice level signal with the mark lengths recorded on a recording medium.
Figure 5:
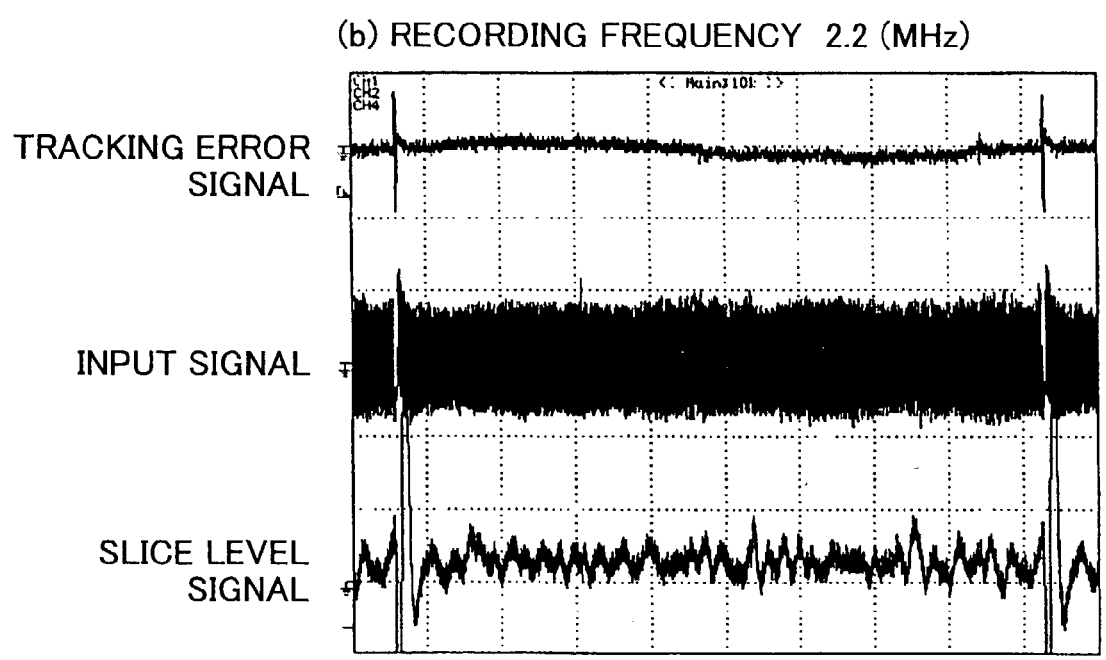
FIG. 5 is a waveform chart showing a fluctuation of the degree of modulation and a fluctuation of the slice level signal with the mark lengths recorded on the recording medium.
Figure 6:
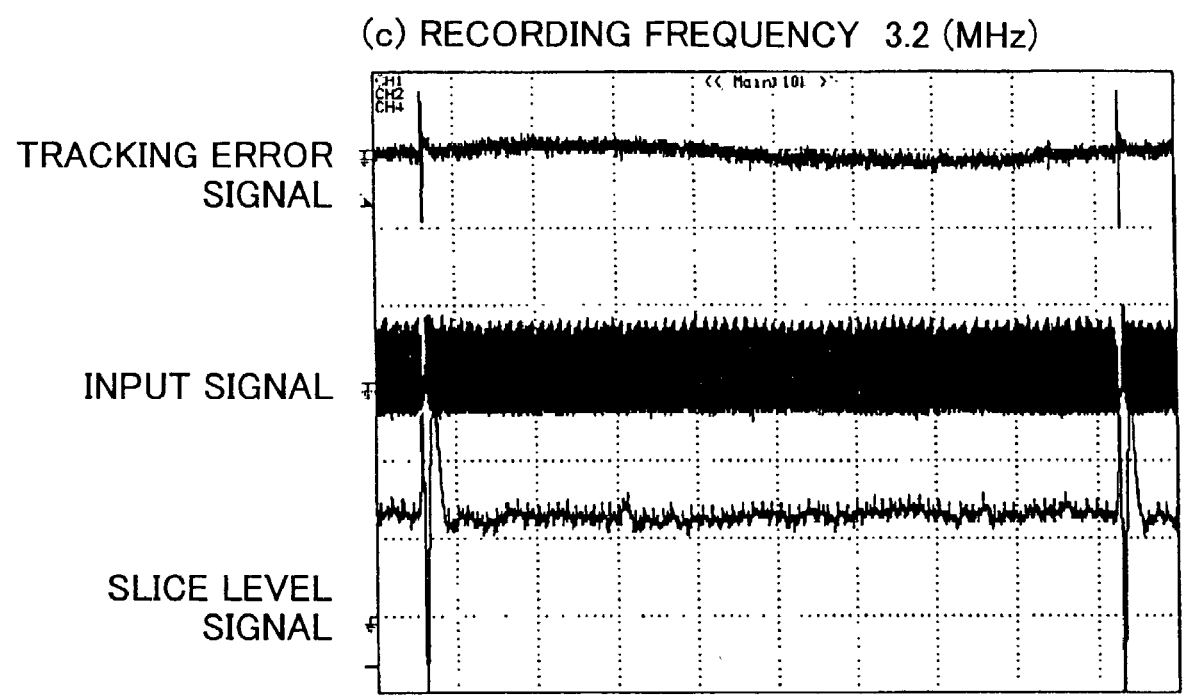
FIG. 6 is a waveform chart showing a fluctuation of the degree of modulation and a fluctuation of the slice level signal with the mark lengths recorded on the recording medium.

FIGS. 4 through 6 are waveform charts showing fluctuations of the degree of modulation and fluctuations of the slice level signal with the mark lengths with which the recording is carried out on a recording medium. In each of the charts, the top signal represents a tracking error signal, the middle signal represents an input signal (a HF signal after waveform equalization in the charts) to be input into the binarization unit, and the bottom signal represents a slice level signal to be returned to the binarization unit. FIG. 4 shows the results of a recording operation for a single frequency signal of a recording frequency of 0.9 MHz. FIG. 5 shows the results of a recording operation for a single frequency signal of a recording frequency of 2.2 MHz. FIG. 6 shows the results of a recording operation for a single frequency signal of a recording frequency of 3.2 MHz.

As shown in FIGS. 4 through 6, where the recording frequency is high, i.e., where the mark length is short, the degree of modulation fluctuates in a wider range, and the slice level signals that are affected by the fluctuation of the degree of modulation greatly fluctuate as a result of a wide fluctuation in the level of the amplitude center. Therefore, to keep the jitter and the error rate low, it is necessary to change the slice level with the fluctuations of shorter marks to some degree.

Figure 7:
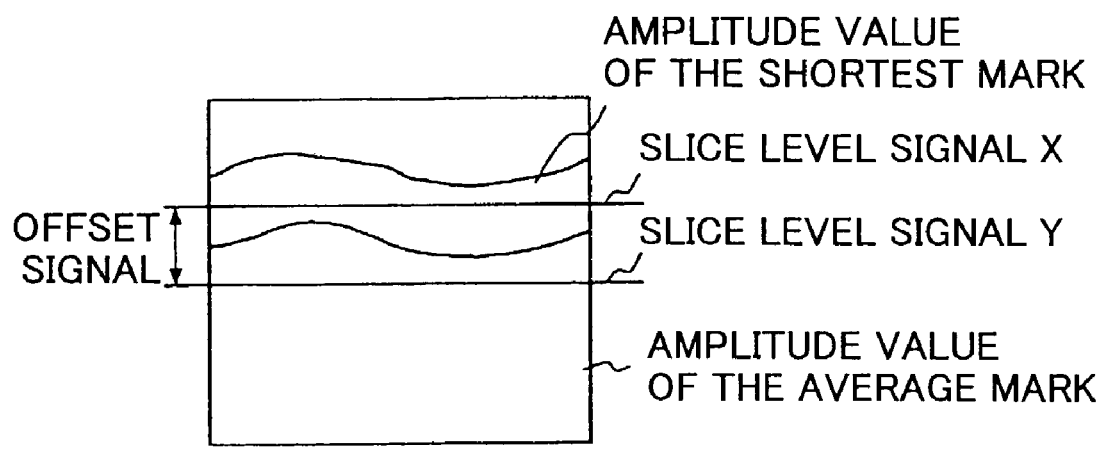
FIG. 7 is a diagram schematically showing fluctuations in amplitude of the average mark and the shortest mark with respect to recording positions.
Figure 8:
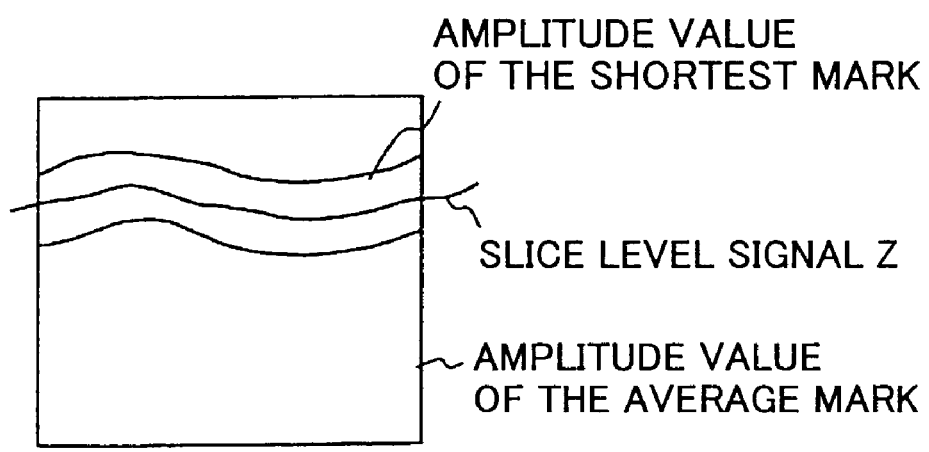
FIG. 8 is a diagram schematically showing fluctuations in amplitude of the average mark and the shortest mark with respect to recording positions.

FIGS. 7 and 8 are diagrams each schematically showing an example of fluctuations in amplitude of the average mark and the shortest mark with respect to the recording positions.

As can be seen from FIGS. 7 and 8, the fluctuation in amplitude of the shortest mark with respect to the recording positions is wide, while the fluctuation in amplitude of the average mark with respect to the recording positions is narrow. This has already been made apparent by FIGS. 4 through 6.

In the case of a recording condition shown in FIG. 7, it is impossible to determine accurately the shortest mark from the slice level signal Y (located substantially at the amplitude center of the average mark) that changes with the average mark length. To solve this, an offset signal is added to the slice level signal Y to obtain a slice level signal X, so that a slice level signal can be set at the center of the shortest mark and that the jitter and the error rate can be improved.

However, as shown in FIG. 7, since the shortest mark has a wider fluctuation in amplitude than the average mark, the reduction on the jitter and the error rate is not yet sufficient.

To reduce the jitter and the error rate sufficiently, the auto slice circuit of this embodiment brings the slice level signal closer to the amplitude center of the shortest mark, and makes the slice level signal follow the fluctuation of the amplitude of the shortest mark, as shown in FIG. 8. By doing so, the jitter and the error rate can be greatly improved.

The dependency of the jitter on the recording power cannot be changed by the slice level. Even if the absolute value of the jitter fluctuates, the recording power with which the jitter becomes smallest cannot be changed, because the jitter is determined by the recording conditions of at least two mark lengths. On the other hand, the dependency of the error rate on the recording power can be changed by changing the slice level signal, because the error rate is greatly affected by the relationship between the shortest mark and the slice level signal. Since the error rate is substantially determined only by the shortest mark, the recording power with which the error rate becomes lowest can be changed. In this manner, reproduction can be carried out with a lower error rate, even if the jitter does not have a preferable value.

To sum up the above facts, the jitter and the error rate can be reduced by bringing the slice level signal closer to the amplitude center of a short mark, especially the shortest mark, and by changing the slice level signal with the fluctuation of the amplitude of a short mark, especially the shortest mark, based on the following points 1) and 2).

1) The jitter and the error rate are affected by a short mark, especially the shortest mark that appears more frequently and has a smaller amplitude.
2) Being greatly affected by the recording area and the condition of the area surrounding the recording area, the fluctuation of the formation condition (such as the amplitude) of a short mark is likely to become wide.

In the following, the auto slice circuit that has the above described function of changing the slice level signal with the fluctuation of the shortest mark will be described in detail.

Figure 2:
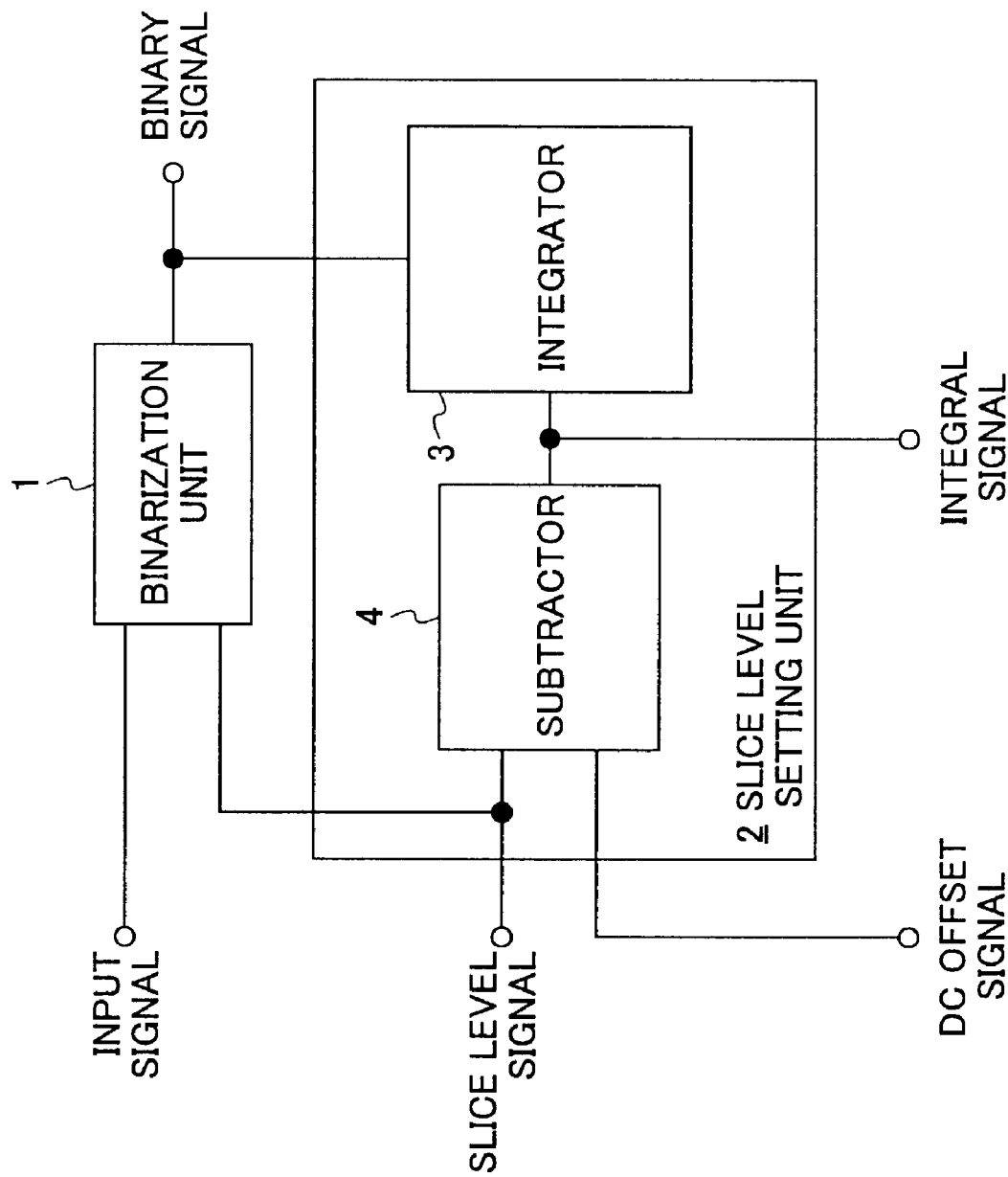
FIG. 2 is a block diagram showing the inner structure of a slice level setting unit 2 shown in FIG. 1.

FIG. 1 is a block diagram showing the structure of the auto slice circuit that is an embodiment of the binarization device in accordance with the present invention. FIG. 2 is a block diagram showing the inner structure of a slice level setting unit 2 shown in FIG. 1.

1) Auto Slice Circuit According to Claim 1 of the Present Invention

In the auto slice circuit shown in FIG. 1, a binarization unit 1 has a function of binarizing a reproduction signal obtained by reproducing information recorded by mark length recording on a recording medium into high-level signals and low-level signals based on the slice level, and then outputting the binary signals. The slice level setting unit 2 then calculates the average value of the high-level signals output from the binarization unit 1, calculates the slice level based on the average value, and sets the slice level to the binarization unit 1. These functions are the same as the functions of the conventional auto slice circuit. The auto slice circuit according to claim 1 of the present invention differs from the conventional auto slice circuit in that the slice level setting unit 2 has a function of adding a predetermined weight to each signal having a short high-level time among the high-level signals.

If the weight adding function is given to the binarization unit 1 in this auto slice circuit, the binarization unit 1 outputs a low-level signal when the level of the reproduction signal of data (information) recorded by mark length recording on an optical disk (a recording medium) is higher than the slice level signal. In this case, the binarization unit 1 outputs a high-level signal when the level of the reproduction signal is lower than the slice level signal. Here, the high-level value of the high-level signal decreases with the lapse of output time. Alternatively, the binarization unit 1 may output a high-level signal when the level of the reproduction signal is higher than the slice level signal, while outputting a low-level signal when the level of the reproduction signal is lower than the slice level signal.

If the weight adding function is given to the slice level setting unit 2, the predetermined weight is added to each signal having a short high-level time among the high-level signals output from the binarization unit 1. As the output voltage for the high-level signals decreases with the long marks or long spaces having a long output time for the high-level signals, the influence of the short marks on the average value for determining the slice level signal can be increased.

As described above, the function of adding the predetermined weight to each signal having a short high-level time can be given either to the binarization unit 1 or the slice level setting unit 2. Examples of the weight adding method include: a method in which the binarization unit 1 outputs signals among which, the shorter high-level time a signal has, the higher high-level voltage the signal has; a method in which the binarization unit 1 outputs signals of high-level values that decrease with the lapse of output time; a method in which the binarization unit 1 outputs a square waveform of a constant high-level value in the conventional manner, while the slice level setting unit 2 adds a predetermined coefficient to each signal having a short high-level time (the averaging operation); a method in which the binarization unit 1 outputs a square waveform of a constant high-level value in the conventional manner, while the slice level setting unit 2 electrically increases the high-level voltage for each signal having a short high-level time; and a method in which the binarization unit 1 outputs a square waveform of a constant high-level value in the conventional manner, while the slice level setting unit 2 electrically decreases the high-level value of each high-level signal with the lapse of output time.

In the above manner, the high-level signals output from the binarization unit 1 are averaged by weighting each high-level signal having a short high-level time, so that the slice level signal is brought closer to the center of the amplitude value of the shortest mark and automatically changes with the fluctuation of the amplitude of the shortest mark. A high-level signal having a shorter high-level time contributes at a higher rate to the average value for determining the slice level signal, so that the slice level signal can change with fluctuations of short marks or short spaces that generate high-level signals each having a short high-level time.

As the slice level signal can automatically change with fluctuations of the binary signal (i.e., short marks or short spaces) having a short high-level time, increases in the jitter and the error rate can be restrained, and the reliability in reproduction can be greatly increased. Even in a case where optimum recording conditions such as recording power have not been selected in the recording device, or in a case where optimum recording has not been carried out for the reproducing device, excellent reproduction can be carried out with a lower error rate with this slice level signal.

2) Auto Slice Circuit According to Claim 2 of the Present Invention

In the above described auto slice circuit according to claim 1 of the present invention, the high-level signals are averaged to determine the slice level signal, but the slice level signal in the above averaging process is determined only by the conditions of either recording marks or spaces. In a case of mark length recording, a signal does not become free of DC in a short time, but there is a possibility that signals such as a combination signal of a short mark and a long space or a combination signal of a short space and a long mark will appear. In such a case, the binarization unit 1 compares a reproduction signal of data recorded by mark length recording on a recording medium with the slice level signal, and then outputs a high-level signal with respect to the space part or a high-level signal with respect to the mark part. This might affect the value of the slice level signal and the compliance of the slice level signal with changes in recording conditions.

To avoid this problem, the binarization unit 1 of the auto slice circuit according to claim 2 of the present invention binarizes a reproduction signal obtained by reproducing information recorded by mark length recording on a recording medium to output high-level signals that are above the slice level and low-level signals that are below the slice level. The binarization unit 1 further binarizes the reproduction signal to output low-level signals that are above the slice level and high-level signals that are below the slice level. The slice level setting unit 2 calculates the average value of the former high-level signals and the average value of the latter high-level signals output from the binarization unit 1. The slice level setting unit 2 further calculates the average value of the former high-level signal average value and the latter high-level signal average value, and sets the last average value to the binarization unit 1. Either the binarization unit 1 or the slice level setting unit 2 has the function of adding a predetermined weight to each signal having a short high-level time among all the above high-level signals.

This auto slice circuit alternately outputs the two types of signals having high-level signals and low-level signals in opposite order switched by the binarization unit 1 based on the slice level signal. More specifically, high-level signals with respect to the space parts of a reproduction signal of data recorded by mark length recording on a recording signal are output, while high-level signals with respect to the mark parts of the reproduction signal of data recorded by mark length recording on the recording medium are output.

As described above, the compliance of the slice level signal can be further improved by a structure in which high-level signals with respect to the space parts are output while high-level signals with respect to the mark parts are output, and the average value of the average values of the former high-level signals and the latter high-level signals is used to determine the slice level signal.

The two types of signals having the high-level signals and the low-level signals in opposite order can be obtained by reversing the polarities of input signals. The polarities are changed by the binarization unit 1, so that the output can be switched between a high-level signal generated from an input signal greater than the slice level signal and a high-level signal generated from an input signal smaller than the slice level signal. Alternatively, the polarities may be changed by the subtractor 4 in the structure shown in FIG. 2. In such a case, either the result of "(DC offset signal)–(integral signal)" or the result of "(integral signal)–(DC offset signal)" should be reflected in the slice level signal.

As the slice level signal can automatically change with fluctuations of each binary signal having a short high-level time (i.e., short marks and short spaces) in the above described structure, increases in the jitter and the error rate can be restrained, and the reliability in reproduction can be greatly increased.

3) Auto Slice Circuit According to Claim 3 of the Present Invention

In the auto slice circuit according to claim 3 of the present invention, the binarization unit 1 shown in FIG. 1 binarizes a reproduction signal obtained by reproducing information recorded by mark length recording on a recording medium to output high-level signals that are above a slice level and low-level signals that are below the slice level, and further binarizes the reproduction signal to output low-level signals that are above the slice level and high-level signals that are below the slice level. The slice level setting unit 2 then calculates the average value of the former high-level signals and the average value of the latter high-level signals output from the binarization unit 1. The slice level setting unit 2 selects one of the two average values based on the condition of the reproduction signal, and determines the slice level from the selected average value. The determined slice level is then set to the binarization unit 1. Either the binarization unit 1 or the slice level setting unit 2 serves as a weight adding means to add a predetermined weight to each signal having a short high-level time among all the above high-level signals.

In the above structure, to increase the reliability in the compliance of the slice level signal, the high-level signals both for the space parts and the mark parts are output, and the more suitable one for recording is selected from the average values of both types of high-level signals to determine the slice level signal. In this structure, it is possible to select either short marks or short spaces for the slice level signal to automatically change with, depending on the recording condition. By doing so, increases in the jitter and the error rate can be restrained, and the reliability in reproducing can be greatly increased.

4) Auto Slice Circuit According to Claim 4 of the Present Invention

Figure 9A:
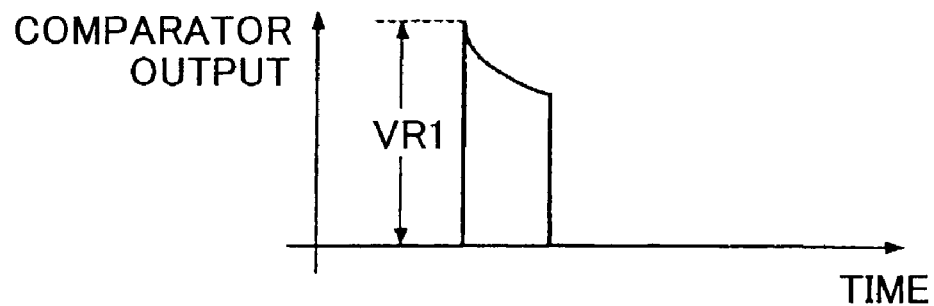
FIGS. 9A through 9C are waveform charts each showing a signal having a high-level value that gradually diminishes with the lapse of high-level time.
Figure 9B:
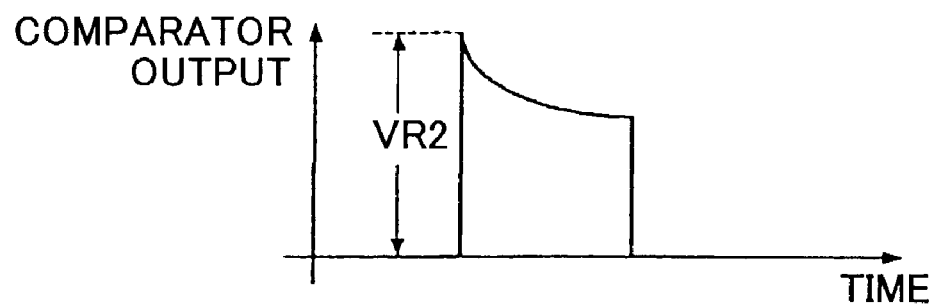
Figure 9C:
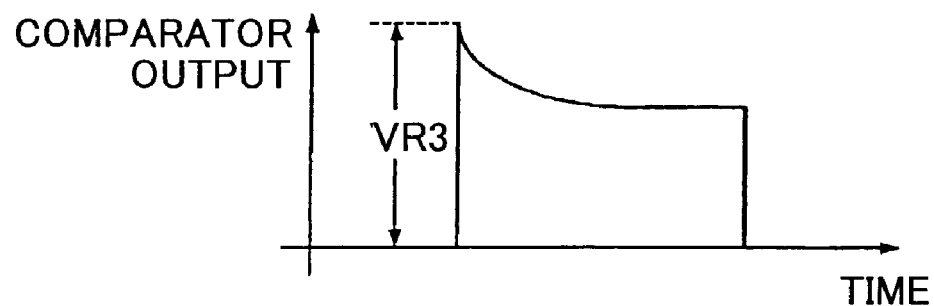

As a specific example of the method of "averaging the high-level signals by weighting each high-level signal having a short high-level time", there is a method in which either the binarization unit 1 or the slice level setting unit 2 serves to decrease the high-level value of each high-level signal with the lapse of output time. FIGS. 9A through 9C show signals each having a high-level value that decreases with the lapse of output time. As shown in FIGS. 9A through 9C, the high-level value of each signal gradually diminishes with the lapse of input signal time.

In this structure, the high-level value of each signal having a long high-level time among the high-level signals decreases with the lapse of output time. Here, VR1, VR2, and VR3 are not necessarily equal to one another, but VR1 may be greater than VR2 while VR2 may be greater than VR3.

In this manner, the slice level signal is made automatically changeable with fluctuations of binary signals each having a short high-level time, i.e., fluctuations of both short marks and short spaces. With this slice level signal, increases in the jitter and the error rate can be restrained, and the reliability in reproduction can be greatly increased.

5) Auto Slice Circuit According to Claim 5 of the Present Invention

Figure 10A:
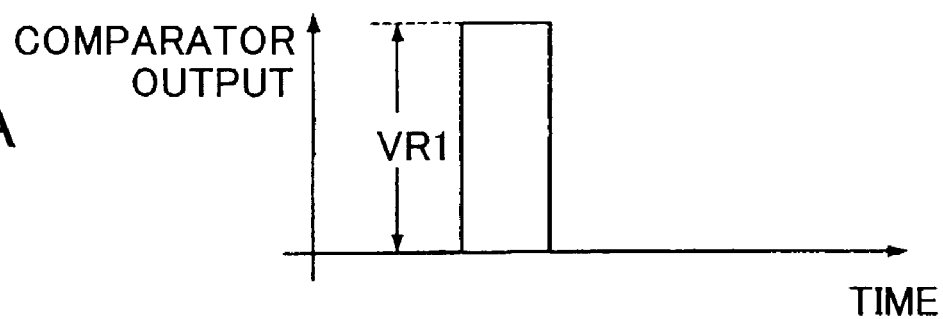
FIGS. 10A through 10C are waveform charts showing signals among which the shorter high-level time a signal has, the greater level value the signal is given.
Figure 10B:
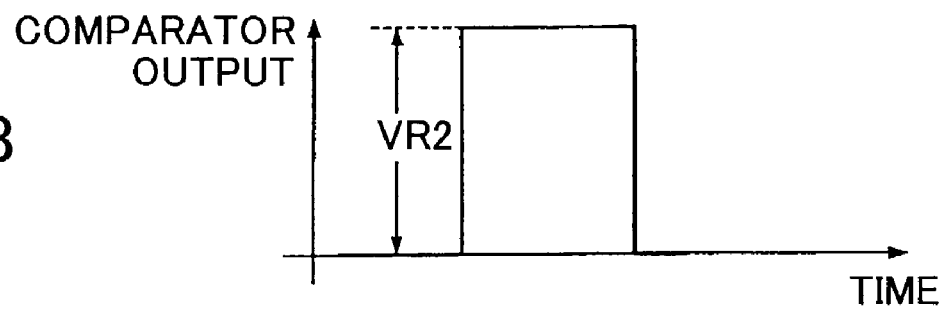
Figure 10C:
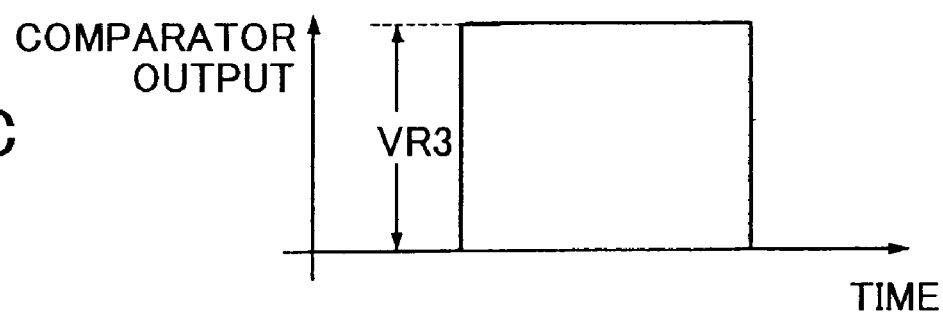

As a specific example of the method of "averaging the high-level signals by weighting each high-level signal having a short high-level time", there is a method in which either the binarization unit 1 or the slice level setting unit 2 serves to give a level value to each signal having a short high-level time among the high-level signals in such a manner that the shorter high-level time a signal has, the greater level value the signal is given. FIGS. 10A through 10C show signals among which, the shorter high-level time a signal has, the greater level value the signal is given. As shown in FIGS. 10A through 10C, the high level value of each signal is constant, not depending on the input signal time, and VR1 may be greater than VR2, which may be greater than VR3. Here, VR1, VR2, and VR3 do not become equal to one another at the same time.

In this structure, the slice level signal is made automatically changeable with fluctuations of binary signals each having a short high-level time, i.e., fluctuations of both short marks and short spaces. With this slice level signal, increases in the jitter and the error rate can be restrained, and the reliability in reproduction can be greatly increased.

6) Auto Slice Circuit According to Claim 6 of the Present Invention

The above described auto slice circuit may have a provision for facilitating the process of determining the slice level signal through the averaging procedure to be carried out by weighting each high-level signal having a short high-level time. More specifically, the fluctuation of the slice level is made greater than the fluctuation of the center value of the amplitude of the second shortest mark length in the reproduction signal in the auto slice circuit shown in FIGS. 1 and 2.

If the fluctuation of the slice level signal with respect to the fluctuation of the recording power is greater than the fluctuation of the center value of the amplitude of the second shortest mark length in the reproduction signal input into the binarization unit 1, the slice level signal proves to be changeable with the fluctuation of the shortest mark length more closely than the fluctuation of the second shortest mark length.

In this manner, the compliance of the slice level signal with the shortest mark length can be increased, and the process of determining the slice level signal through the averaging procedure to be carried out by weighting each high-level signal having a short high-level signal can be made more effective.

As described above, the fluctuation of the slice level signal with respect to the fluctuation of the recording power in a reproducing operation with the varied recording power is made greater than the fluctuation of the center value of the amplitude of the second shortest mark length in the reproduction signal, so that the slice level signal is made automatically changeable with fluctuations of short marks or short spaces. In this manner, increases in the jitter and the error rate can be restrained, and the reliability in reproduction can be greatly increased.

7) Auto Slice Circuit According to Claim 7 of the Present Invention

The above auto slice circuit may have another provision for facilitating the process of determining the slice level signal through the averaging procedure to be carried out by weighting each high-level signal having a short high-level time.

In this auto slice circuit, a predetermined weight is added to each signal having a short high-level time, so that the curves representing the recording mark length dependencies of the differences among mark lengths and space lengths cross between the shortest mark length and the second shortest mark length.

Figure 11:
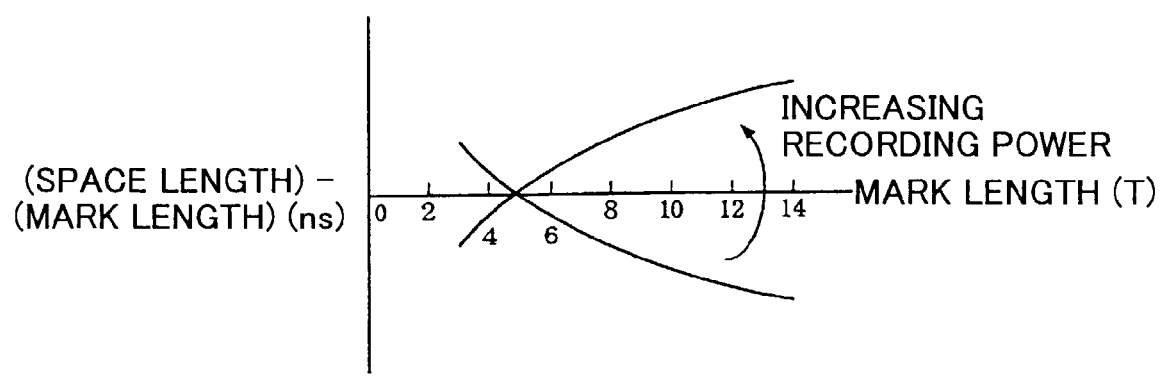
FIG. 11 is a diagram showing the curves representing the recording mark length dependencies of the differences among mark lengths and space lengths with varied recording power.
Figure 12:
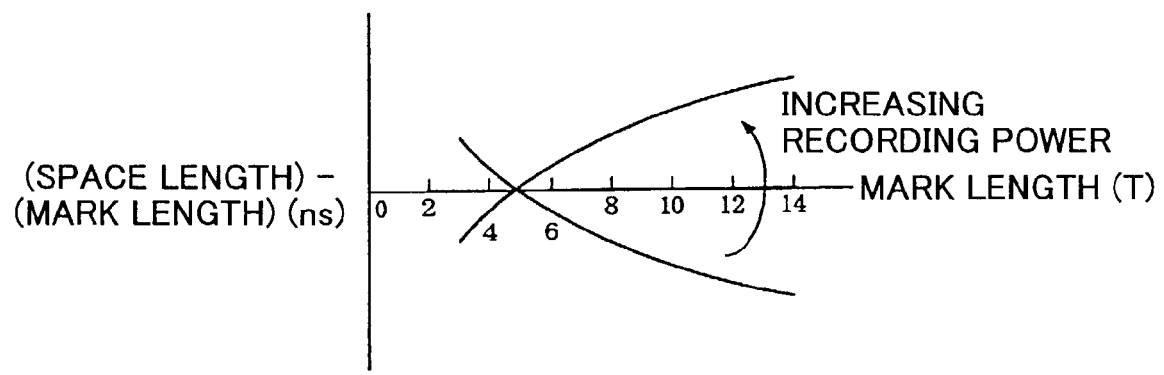
FIG. 12 is a diagram showing the curves representing the recording mark length dependencies of the differences among mark lengths and space lengths with varied recording power.
Figure 13:
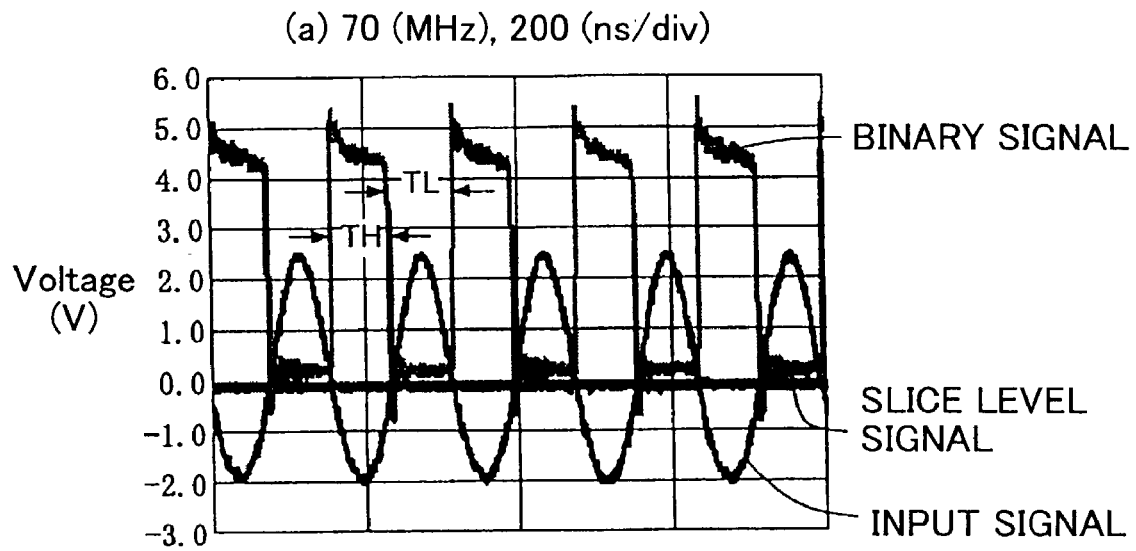
FIG. 13 is a waveform chart showing changes of an input signal, a binary signal, and a slice level signal.
Figure 14:
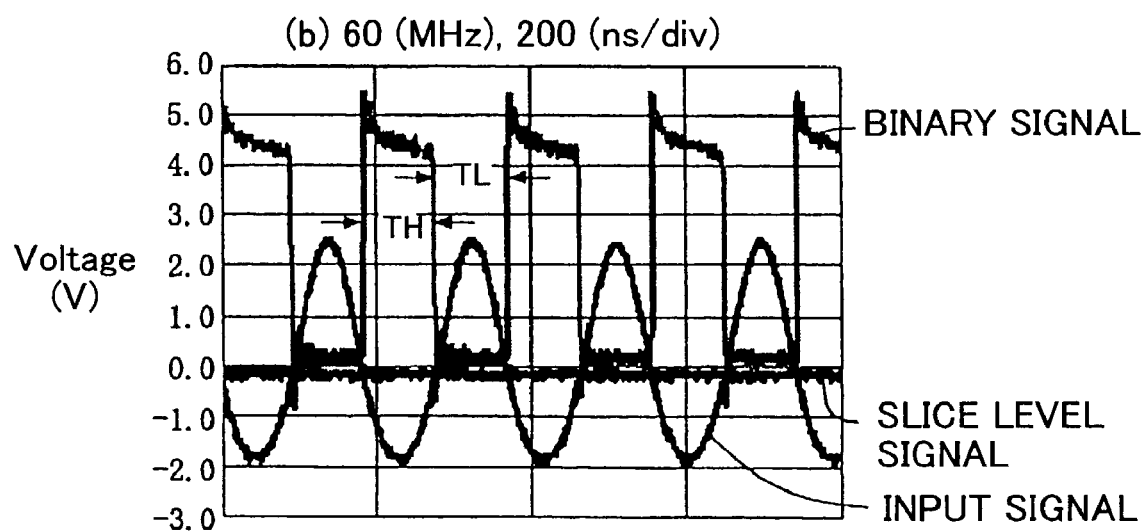
FIG. 14 is a waveform chart showing changes of an input signal, a binary signal, and a slice level signal.
Figure 15:
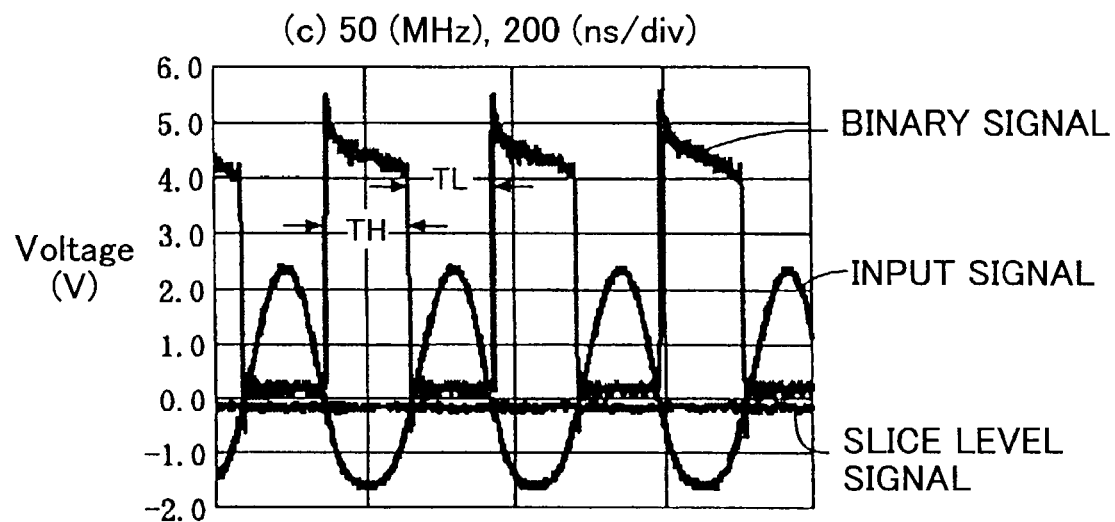
FIG. 15 is a waveform chart showing changes of an input signal, a binary signal, and a slice level signal.
Figure 16:
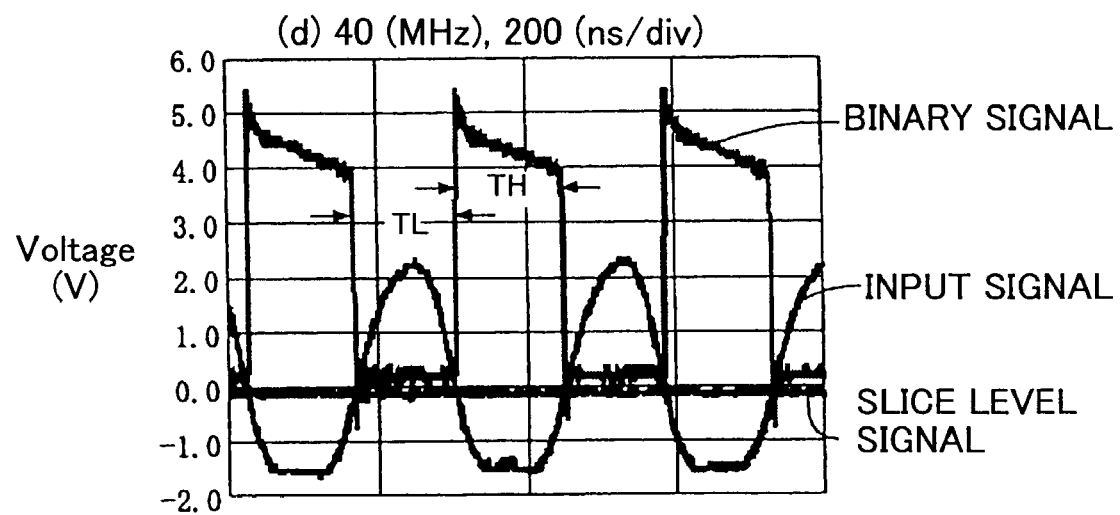
FIG. 16 is a waveform chart showing changes of an input signal, a binary signal, and a slice level signal.

FIGS. 11 and 12 are diagrams showing the curves representing the recording mark length dependencies of the differences among the mark lengths and the space lengths with varied recording power. Each of the diagrams shows an example of a DVD having the shortest mark length of 3T and the average mark length of 5T.

Where the curves representing the recording mark length dependencies of the differences among the mark lengths and the space lengths with varied recording power cross between the shortest mark length and the second shortest mark length, as shown in FIG. 11, the compliance of the slice level signal with respect to the shortest mark can be increased. Furthermore, the process of determining the slice level signal through the averaging procedure carried out by weighting each high-level signal having a short high-level time can be made more effective in the above auto slice circuit.

In the above case where the slice level signal follows the fluctuation of the shortest mark length more closely than the fluctuation of the second shortest mark length, the curves representing the recording mark length dependencies of the differences among the mark lengths and the spaces lengths cross between the shortest mark length and the second shortest mark length. On the other hand, where the slice level signal follows the fluctuation of the average mark length, the curves representing the recording mark length dependencies of the differences among the mark lengths and the space lengths cross at the average mark length, as shown in FIG. 12.

In this auto slice circuit, the curves representing the recording mark length dependencies among the mark lengths and the space lengths with varied recording power cross between the shortest mark length and the second shortest mark length, so that the slice level can automatically change with fluctuations of short marks or short spaces. In this manner, increases in the jitter and the error rate can be restrained, and the reliability in reproduction can be greatly increased.

8) Auto Slice Circuit According to Claim 8 of the Present Invention

To increase the reliability in reproduction even further, a slice offset signal may be added to the slice level signal, so that the slice level signal matches with the center of the amplitude of the shortest mark length. With the slice offset signal, the slice level signal can automatically change with fluctuations of short marks, and reproduction can be carried out with the lowest error rate possible under the given reproduction condition.

Figure 3:
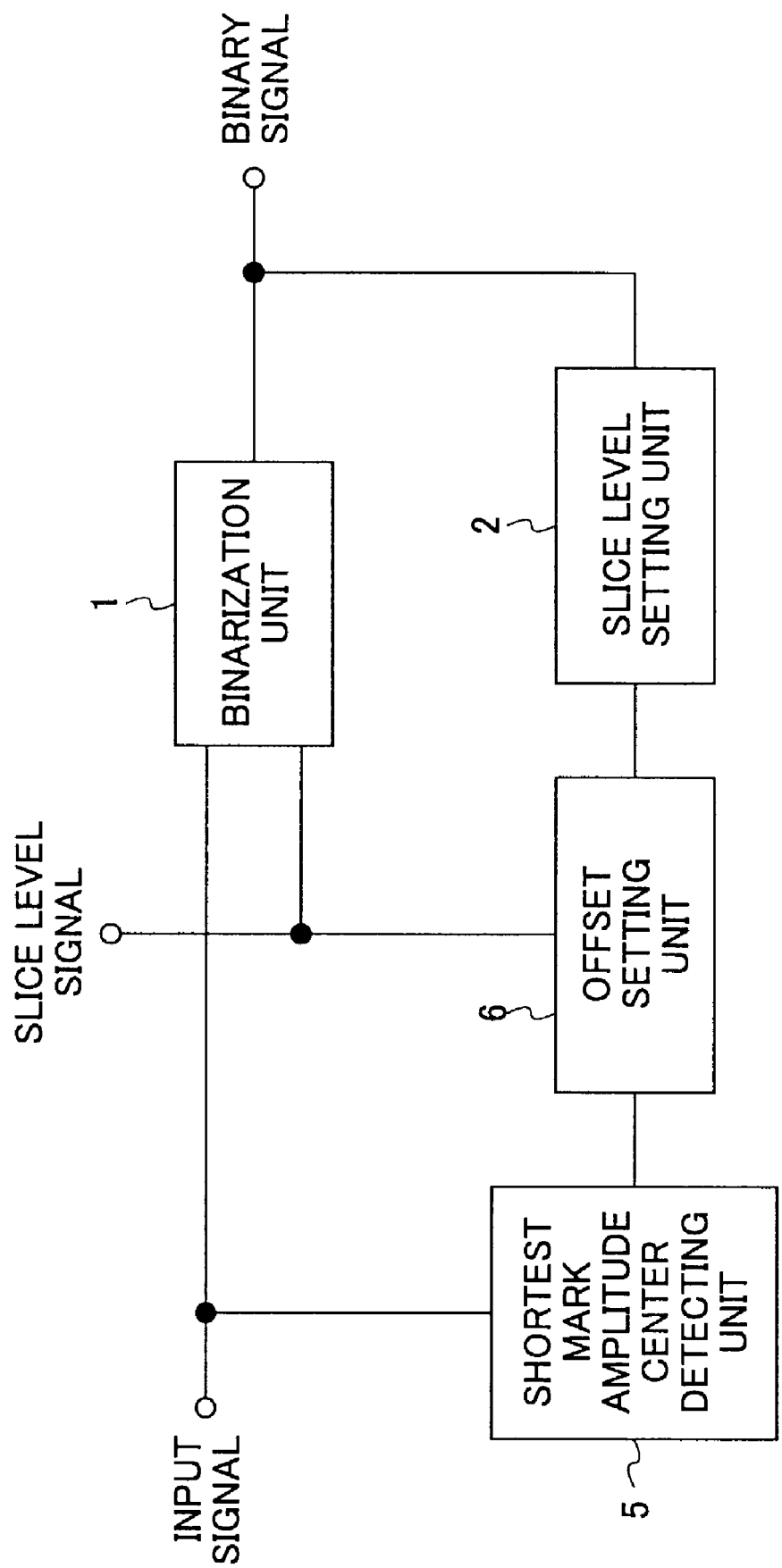
FIG. 3 is a block diagram showing another example of the auto slice circuit in accordance with the present invention.

FIG. 3 is a block diagram showing another example of the auto slice circuit in accordance with the present invention. In this auto slice circuit, a shortest mark amplitude center detecting unit 5 detects the amplitude center value of the shortest mark length in the reproduction signal. An offset setting unit 6 serves as a slice offset adding unit that adds a slice offset value to the slice level determined by the slice level setting unit 2, so that the slice level to be set to the binarization unit 1 matches with the amplitude center value detected by the shortest mark amplitude center detecting unit 5.

In this structure, the adjustment of the slice level signal depending on the reproduction condition is very easily made by the addition of an offset value to the slice level signal to match with the amplitude center value of the shortest mark length. Thus, an optimum slice level can be easily set in this auto slice circuit. By adjusting the slice level signal with the slice offset value, excellent reproduction can be carried out with the lowest error rate, even if the recording is not in optimum condition.

As described above, the amplitude center value of the shortest mark length in the reproduction signal is detected, and the slice offset signal is added to the slice level signal, so that the slice level signal matches with the amplitude center value. With this structure, excellent reproduction can be carried out with the lowest error rate, even if the recording is not in optimum condition. Accordingly, the reliability in reproduction can be greatly increased.

As reproduction can be carried out with the lowest error rate regardless of the recording condition, control restrictions in the recording device can be relaxed, and the productivity can be increased.

9) Auto Slice Circuit According to Claim 9 of the Present Invention

In the above auto slice circuit, it is preferable to specify a recording medium with which the process of determining the slice level signal through the averaging procedure carried out by weighting each high-level signal having a short high-level signal can be made more effective.

In this auto slice circuit according to claim 9 of the present invention, a recording medium employed has physical change parts that are asymmetrically located in two non-recording areas between which a track having marks recorded thereon is located, with the center line of the track being the center of the asymmetrical situations (locations) of the physical change parts.

More specifically, a recording medium that might cause a great variation in the formation condition of the shortest mark or a wide fluctuation in the amplitude value is specified as "a recording medium that has physical change parts that are asymmetrically located in two non-recording areas between which a track having marks recorded thereon is located, with the center line of the track being the center of the asymmetrical situations of the physical change parts" in the present invention. Also, the present invention specifies that the center line of the track on which recording marks are recorded is meandering in such a recording medium.

This "recording medium having the meandering (varying radially) track center line" is a recording medium having guide grooves consisting of lands and grooves. In such a recording medium, so-called wobbles are formed for the grooves and lands to indicate addresses and control information.

Another example of "a recording medium that has physical change parts that are asymmetrically located in two non-recording areas between which a track having marks recorded thereon is located, with the center line of the track being the center of the asymmetrical situations of the physical change parts" is a recording medium, such as an optical disk, having guide grooves consisting of lands and grooves, with only the grooves being used as recording areas. In such a recording medium, so-called land pre-pits representing address information are formed in the lands. By specifying the requirements for a recording medium to obtain better effects from the auto slice circuit, the usability of the auto slice circuit of this embodiment can be easily increased.

[Example of Information Reproducing Device Equipped with Auto Slice Circuit of the Present Invention]

The auto slice circuit in this example of an information reproducing device has the same structure as the structure shown in FIG. 1. The output signal of the binarization unit 1 is a signal having a high-level value that decreases (or attenuates) with the lapse of output time, as shown in FIGS. 9A through 9C.

[Performance Check 1 on Information Reproducing Device Equipped with Auto Slice Circuit of the Present Invention]

First, the binarization process that had been carried out by the binarization unit 1 was confirmed as a binarization process in which short marks were weighted.

Using an optical pick-up of a wavelength of 660 nm and an NA of 0.65, a 14T single pattern was recorded on a commercially available DVD-R at a varied recording clock frequency, and reproduction was carried out with the same optical pick-up. Then, the operation performed by the auto slice circuit of the information reproducing device used for the reproduction was checked. Here, the input signal to be input into the binarization unit 1, the slice level signal to be returned to the binarization unit 1, and the binary signal were examined.

Figure 17:
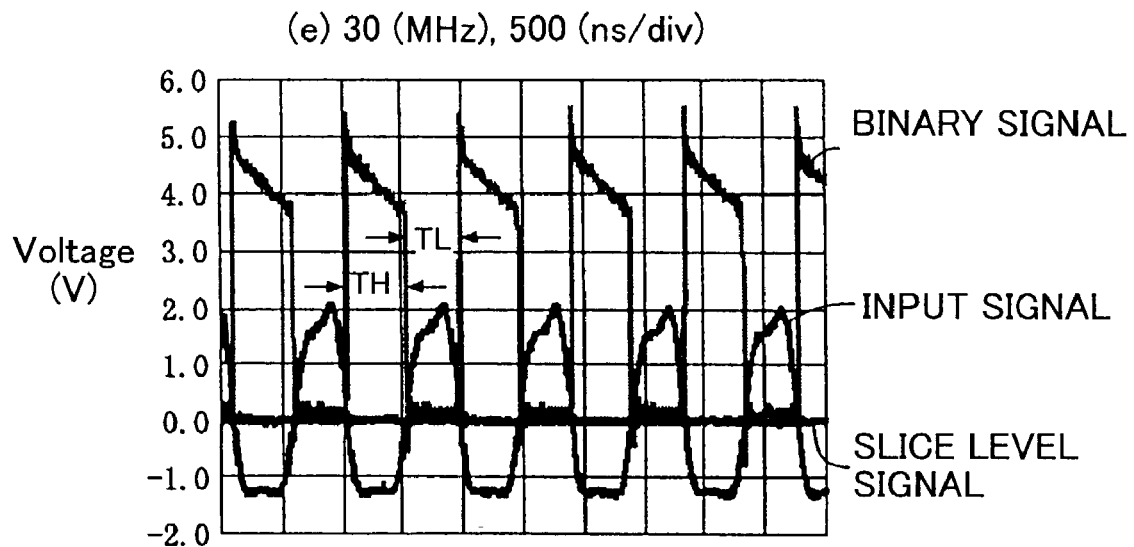
FIG. 17 is a waveform chart showing changes of an input signal, a binary signal, and a slice level signal.
Figure 18:
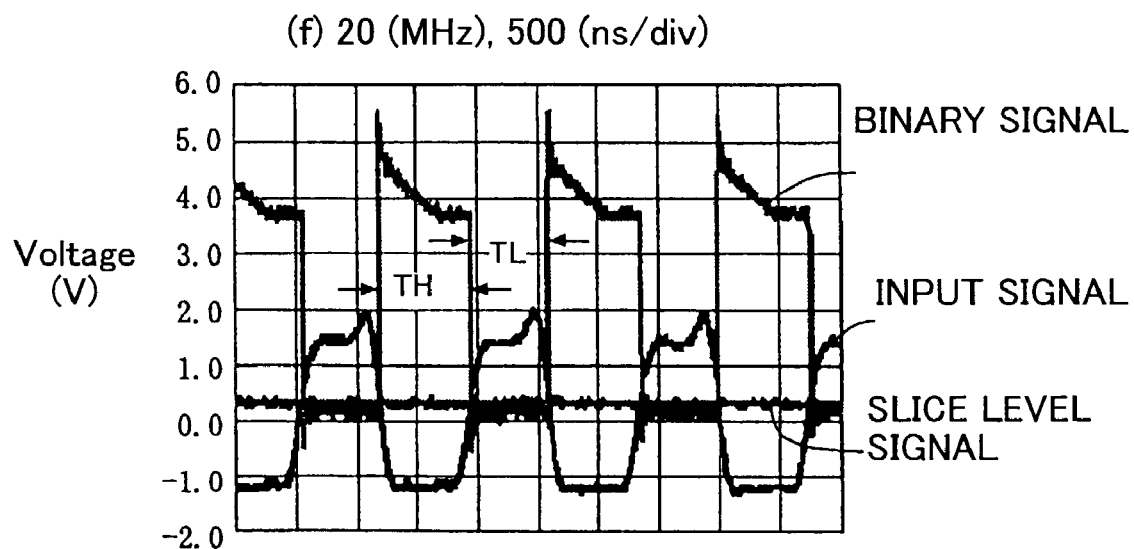
FIG. 18 is a waveform chart showing changes of an input signal, a binary signal, and a slice level signal.
Figure 19:
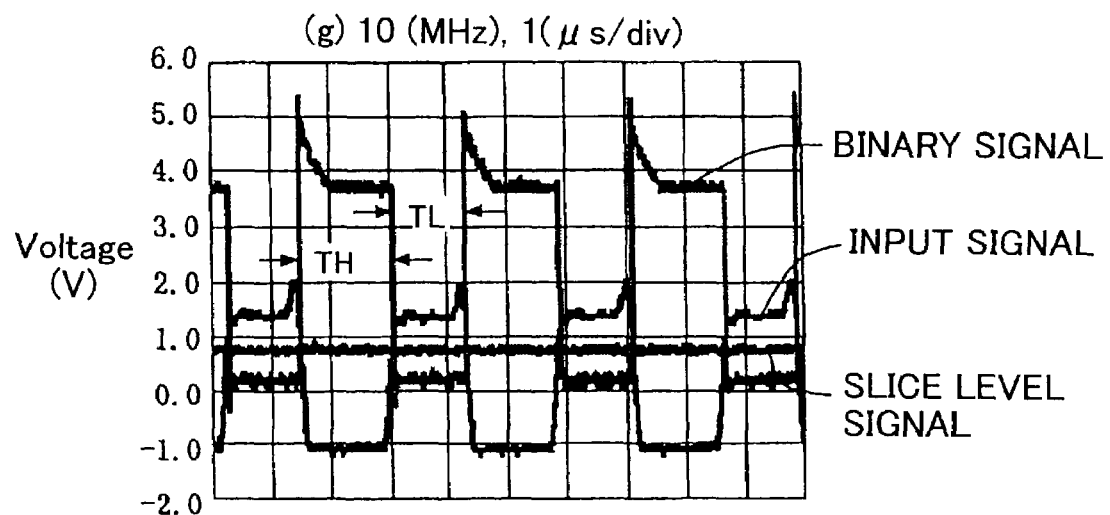
FIG. 19 is a waveform chart showing changes of an input signal, a binary signal, and a slice level signal.

The results of the examination show that the high-level time TH of the binary signal was substantially equal to the low-level time TL of the binary signal, when the frequency of the input signal was high, as shown in FIGS. 13 through 16. However, as the frequency of the input signal decreased, the high-level time TH of the binary signal became longer than the low-level time TL of the binary signal, as shown in FIGS. 17 through 19. This is because the smallest value of the high-level signal of the binary signal gradually decreased with the decrease of the frequency of the input signal, and the voltage value of the slice level signal to be returned to the binarization unit 1 increased, as shown in FIGS. 13 through 19.

Figure 20:
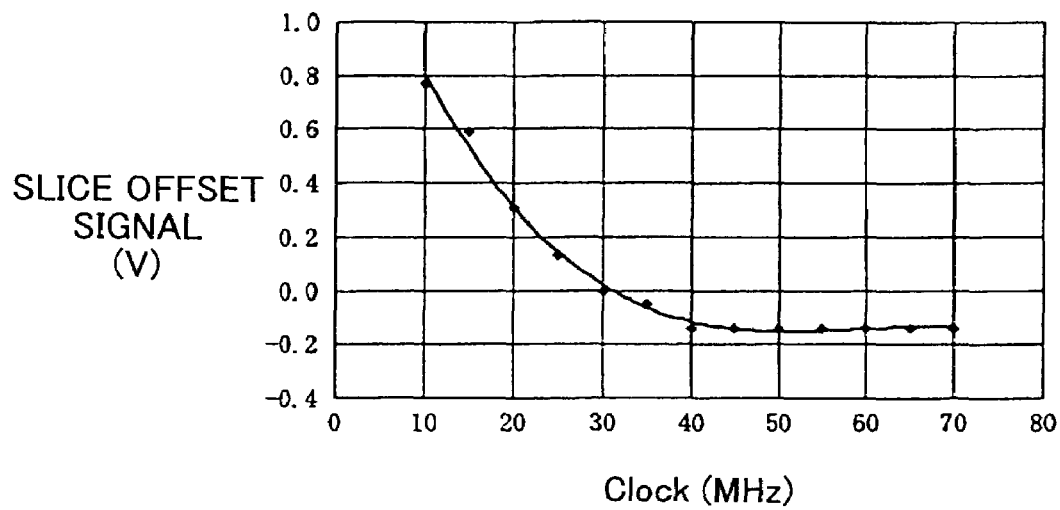
FIG. 20 is a diagram showing the relationship between the frequency of an input signal and a slice level signal to be returned to the binarization unit 1.

FIG. 20 is a diagram showing the relationship between the frequency of the input signal and the voltage value of the slice level signal to be returned to the binarization unit 1. The relationship confirmed that the voltage value of the slice level signal to be returned to the binarization unit 1 increases with a decrease in the frequency of the input signal.

Figure 21:
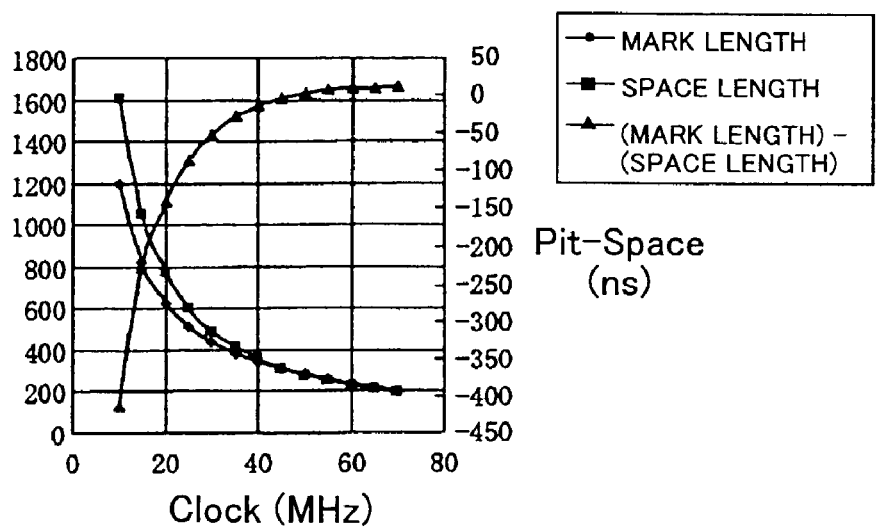
FIG. 21 is a waveform chart showing changes of the frequency of mark lengths and space lengths.

The relationship between the frequency signal and the high-level time (corresponding to the space length) and the low-level time (corresponding to the mark length) of the binary signal was also examined. The results shown in FIG. 21 confirmed that the high-level time (the space length) and the low-level time (the mark length) were substantially equal when the frequency of the input signal was high, but, as the frequency of the input signal decreased (below 40 MHz, for instance), the space length became longer than the mark length.

The above results confirmed that, the longer high-level time a high-level signal has, the lower the high-level voltage of the high-level signal becomes, and that the information reproducing device equipped with the auto slice circuit of this embodiment can increase the ratio of the binary signals of short marks to the average value (the integral value) of the binary signals.

[Performance Check 1 on Information Reproducing Device Equipped with Conventional Auto Slice Circuit]

Using an optical pick-up of a wavelength of 660 nm and an NA of 0.65, a random pattern of 8–16 modulation was recorded on a commercially available DVD-R at a linear velocity of 2.5 times (or 8.5 m/s), with the recording power being varied.

In an information reproducing device equipped with a conventional auto slice circuit (this information reproducing device will be hereinafter referred to as "the conventional device"), a binary signal output from the binarization unit had a perfect square waveform, and the slice level was always set at a value close to the amplitude center value of the average mark length determined by a modulation method.

Figure 22:
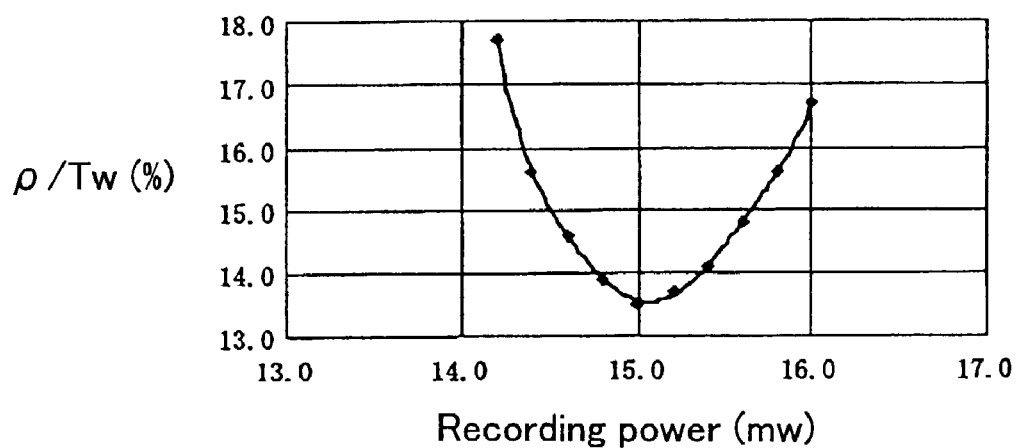
FIG. 22 is a diagram showing changes of the jitter (σ/Tw) that were measured when the recorded area of a DVD-R was reproduced by a conventional reproducing device.

The recorded area of the DVD-R was reproduced by the conventional device equipped with the auto slice circuit, and the jitter (σ/Tw) was measured. The results are shown in FIG. 22. As can be seen from the results, the margin of the jitter (σ/Tw) with respect to the recording power was very narrow in the conventional device.

Figure 23:
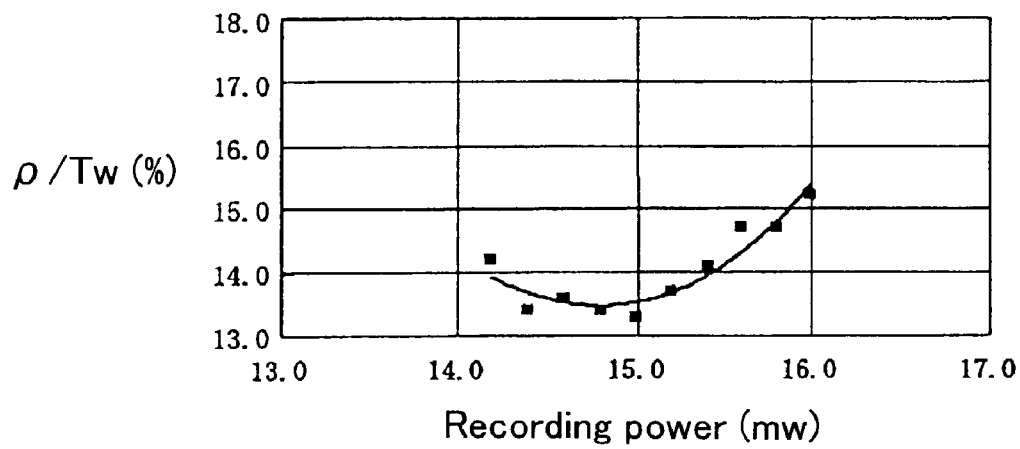
FIG. 23 is a diagram showing changes of the jitter (σ/Tw) that were measured when the slice level was adjusted by the conventional reproducing device so as to minimize the jitter (σ/Tw)

Next, the slice level was adjusted by the conventional device, so that the jitter (σ/Tw) could become minimum. More specifically, an optimum slice offset value for the recording condition was determined, and the determined slice offset value was added to the slice level. The jitter (σ/Tw) of the DVD-R was then measured. The results are shown in FIG. 23. As can be seen from the results, the margin of the jitter (σ/Tw) with respect to the recording power can be widened by the conventional device adjusting the slice level signal. However, the error rate (the average number of PI errors in 8 ECC blocks) became lowest with a recording power of 14.8 mw, exceeding 500. (Note: "The error rate . . . became lowest . . . exceeding 500" sounds strange.)

[Performance Check 2 on Information Reproducing Device Equipped with Conventional Auto Slice Circuit]

Using an optical pick-up of a wavelength of 660 nm and an NA of 0.65, a random pattern of 8–16 modulation was recorded on a commercially available DVD-R at a linear velocity of 1.0 time (or 3.5 m/s), with the recording power being varied.

In the auto slice circuit of the conventional device, a binary signal output from the binarization unit had a perfect square waveform, and the slice level was always set at a value close to the amplitude center value of the average mark length determined by a modulation method.

In this conventional device, the slice level signal was adjusted by the conventional device, so that the jitter (σ/Tw) could become minimum. More specifically, an optimum slice offset value for the recording condition was determined, and the determined slice offset value was added to the slice level. The jitter (σ/Tw) of the DVD-R was then measured.

As a result, both the jitter and the error rate (the average number of PI errors in 8 ECC blocks) became minimum with a recording power of 9.0 mw. However, the jitter was 13.2%, and the error rate exceeded 500.

[Performance Check 2 on Information Reproducing Device Equipped with Auto Slice Circuit of the Present Invention]

Using an optical pick-up of a wavelength of 660 nm and an NA of 0.65, a random pattern of 8–16 modulation was recorded on a commercially available DVD-R at a linear velocity of 2.5 times (or 8.5 m/s), with the recording power being varied.

Figure 24:
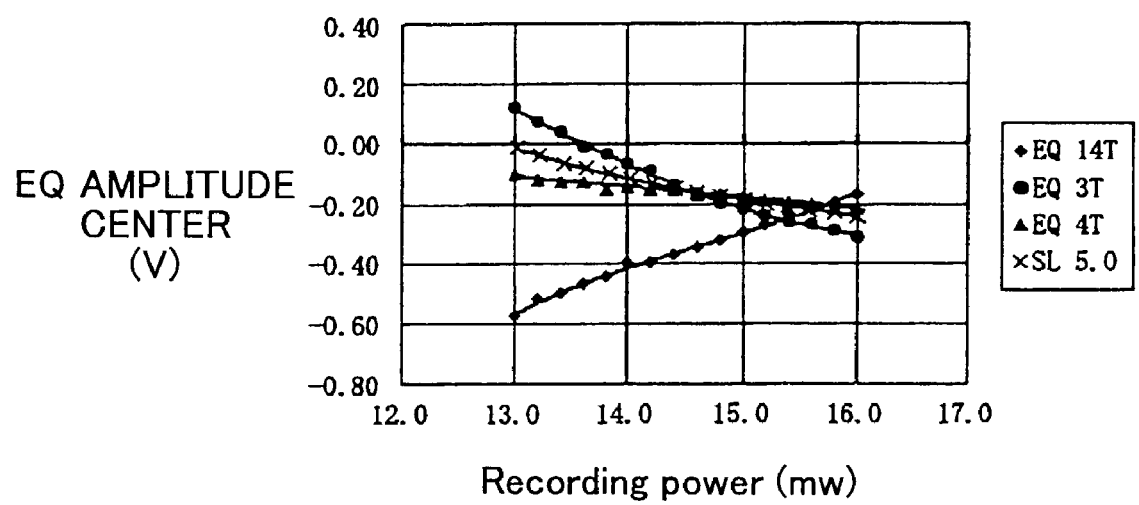
FIG. 24 is a diagram showing changes of the amplitude center values of the shortest mark, the second shortest mark, and the mark showing the greatest amplitude, and changes of the slice level signal, respectively with changes of recording power.

The recorded area of the DVD-R was reproduced with an optical pick-up of a wavelength of 650 nm and an NA of 0.60, and measurement was made on changes of the amplitude center values of the shortest mark (3T in this example), the second shortest mark (4T in this example), and the mark showing the greatest amplitude (14T in this example, but the mark length showing the greatest amplitude is not necessarily 14T), and changes of the slice level signal, respectively with changes of the recording power. The results are shown in FIG. 24. Here, each signal for which the amplitude center values were measured was a signal prior to the input into the binarization unit 1, and was obtained by carrying out polarity reversal on a signal obtained by carrying out waveform equalization on a reproduction HF signal.

In FIG. 24, EQ3T represents the amplitude center value of the shortest mark, EQ4T represents the amplitude center value of the second shortest mark, EQ14T represents the amplitude center value of the mark length showing the greatest amplitude, and SL5.0 represents the slice level signal.

The results confirmed that, by the information reproducing device of this embodiment, the fluctuation of the slice level signal with changes of the recording power is set at a greater value than at least the fluctuation of the amplitude center value of the second shortest mark length among light reception signals to be input into the binarization unit 1.

Figure 25:
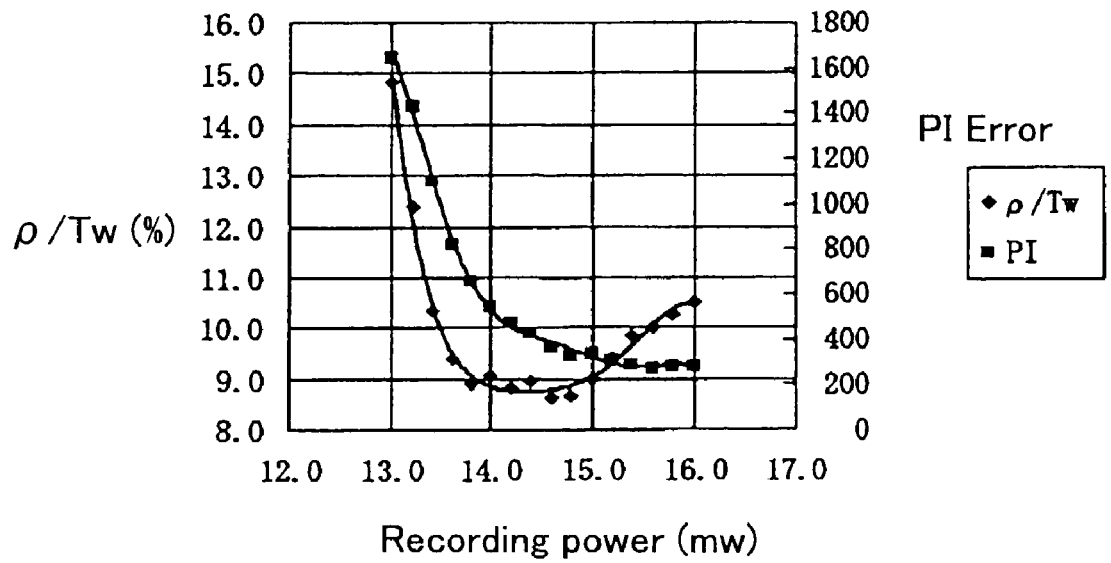
FIG. 25 is a diagram showing changes of the jitter (σ/Tw) and the error rate that were measured when the slice level signal was set by a device of the present invention.

The effects of the above setting of the slice level signal were then examined. FIG. 25 is a diagram showing the results of measurement on the jitter (σ/Tw), and the results of measurement on the error rate (the average number of PI errors in 8 ECC blocks). As can be seen from the results, the recording power margin of the jitter (σ/Tw) and the error rate was greatly widened, compared with the recording power margin of a conventional reproducing device. This proves that the information reproducing device of this embodiment is very advantageous.

Figure 26:
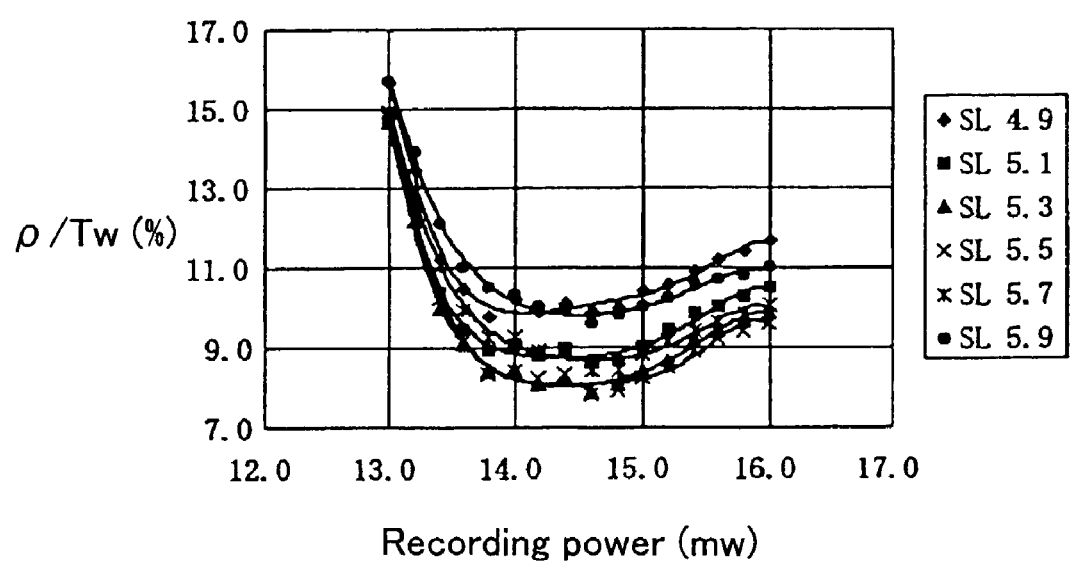
FIG. 26 is a diagram showing changes of the jitter (σ/Tw) that were measured when an offset signal was manually added to the slice level signal.
Figure 27:
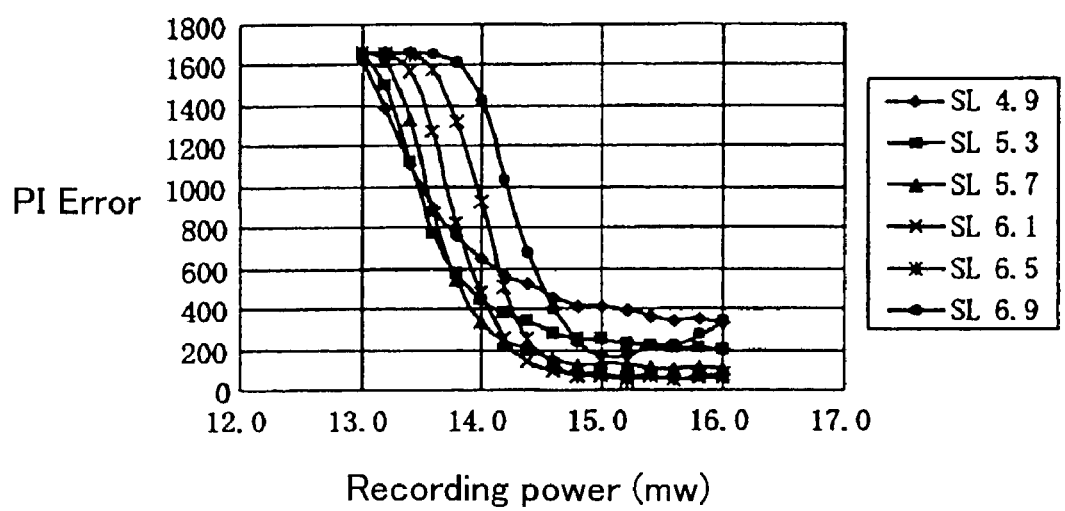
FIG. 27 is a diagram showing changes of the error rate that were measured when an offset signal was manually added to the slice level signal.

Next, measurement was made on changes in the jitter (σ/Tw) and the error rate when an offset signal was manually added to the slice level signal. Here, the slice offset value was set at a constant value, regardless of recording conditions. The results are shown in FIGS. 26 and 27. The numerical values shown as examples in FIGS. 26 and 27 represent offset dial values added to the slice level signal.

As can be seen from the results, the range of recording power with which the error rate becomes lowest can be changed by adding an offset signal to the slice level signal. This confirms that excellent reproduction can be carried out with a low error rate, even where the recording conditions are not optimum, or where optimum recording has not been carried out for the reproducing device, i.e., the jitter is not showing a preferable value for the information reproducing device carrying out the reproduction.

Figure 28:
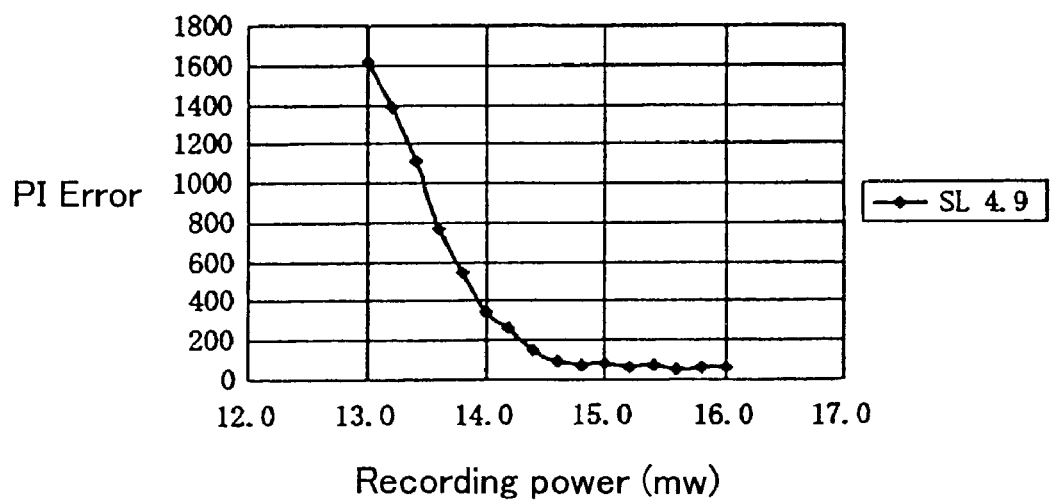
FIG. 28 is a diagram showing changes of the error rate that were measured when an offset signal was automatically added to the slice level signal so that the slice level signal could match with the amplitude center value of the shortest mark.

Next, the recorded area in which the random pattern had been recorded with varied recording power was reproduced by the information reproducing device equipped with the auto slice circuit shown in FIG. 3, i.e., the information reproducing device in which the shortest mark amplitude center detecting unit 5 detects the amplitude center value of the shortest mark in the input signal to be input into the binarization unit 1, and the offset setting unit 6 adds an offset signal to the slice level so that the amplitude center value substantially matches with the signal output from the slice level setting unit 2. As shown in FIG. 28, the results confirmed that excellent reproduction could be carried out with a very low error rate over a wide range of recording power.

[Performance Check 3 on Information Reproducing Device Equipped with Auto Slice Circuit of the Present Invention]

Using an optical pick-up of a wavelength of 660 nm and an NA of 0.65, a random pattern of 8–16 modulation was recorded on a commercially available DVD-R at a linear velocity of 1.0 time (or 3.5 m/s), with the recording power being varied.

Figure 29:
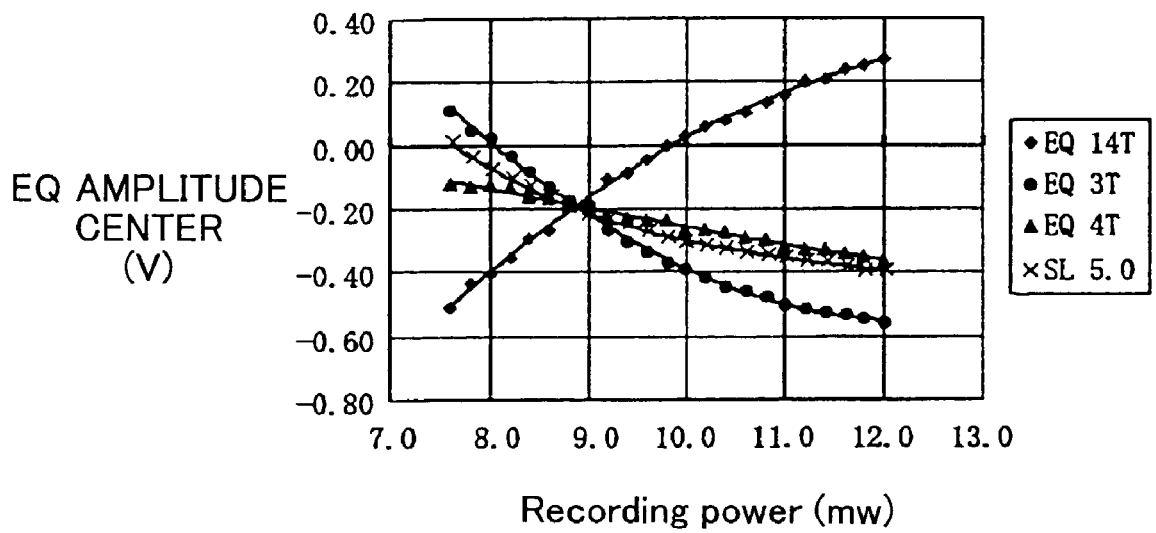
FIG. 29 is a diagram showing changes of the amplitude center values of the shortest mark, the second shortest mark, and the mark showing the greatest amplitude, and changes of the slice level signal, respectively with changes of recording power.

The recorded area of the DVD-R was reproduced with an optical pick-up of a wavelength of 650 nm and an NA of 0.60, and measurement was then made on changes of the amplitude center values of the shortest mark (3T in this example), the second shortest mark (4T in this example), and the mark showing the greatest amplitude (14T in this example, but the mark length showing the greatest amplitude is not necessarily 14T), and changes of the slice level signal, respectively with changes of recording power. The results are shown in FIG. 29. Here, each signal for which the amplitude center value was measured was a signal prior to the input into the binarization unit 1, and was obtained by carrying out polarity reversal on a signal obtained by carrying out waveform equalization on a reproduction HF signal.

In FIG. 29, EQ3T represents the amplitude center value of the shortest mark, EQ4T represents the amplitude center value of the second shortest mark, EQ14T represents the amplitude center value of the mark length showing the greatest amplitude, and SL5.0 represents the slice level signal.

The results shown in FIG. 29 confirmed that, by the information reproducing device of this embodiment, the fluctuation of the slice level signal with changes of the recording power is set at a greater value than at least the fluctuation of the amplitude center value of the second shortest mark length among light reception signals to be input into the binarization unit 1.

Figure 30:
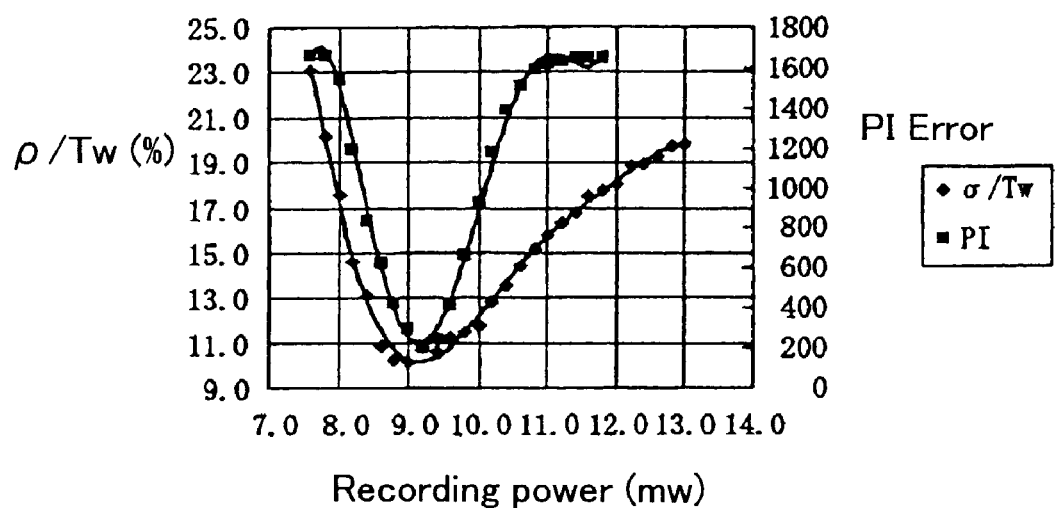
FIG. 30 is another diagram showing changes of the jitter (σ/Tw) and the error rate that were measured when the slice level signal was set by the device of the present invention.

The effects of the above setting of the slice level signal were then examined. FIG. 30 is a diagram showing the results of measurement on the jitter (σ/Tw), and the results of measurement on the error rate (the average number of PI errors in 8 ECC blocks). As can be seen from the results, the recording power margin of the jitter (σ/Tw) and the error rate was greatly widened, compared with the recording power margin for a conventional reproducing device. This proves that the information reproducing device of this embodiment is very advantageous.

Figure 31:
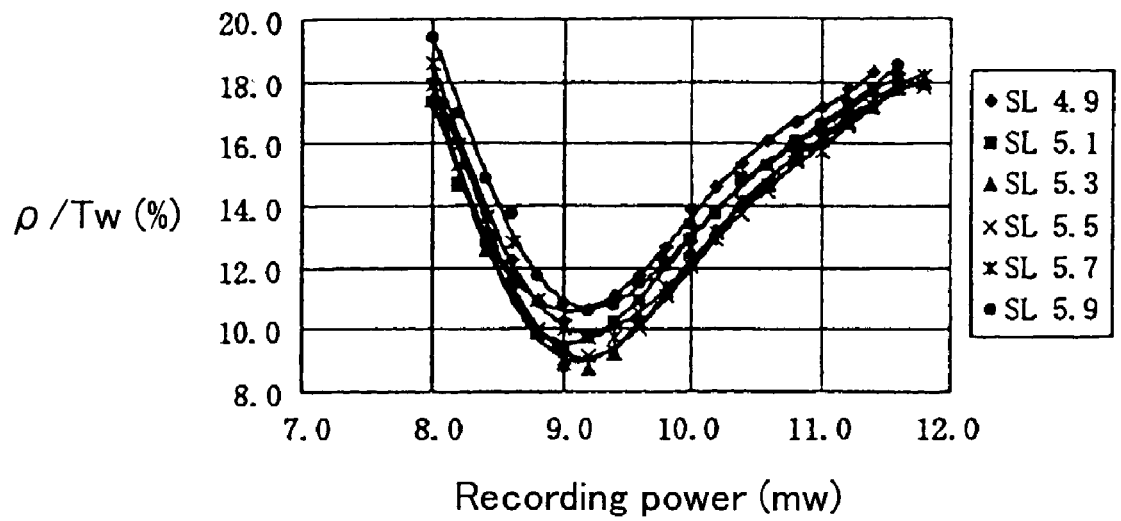
FIG. 31 is a diagram showing changes of the jitter (σ/Tw) that were measured when an offset signal was manually added to the slice level signal.
Figure 32:
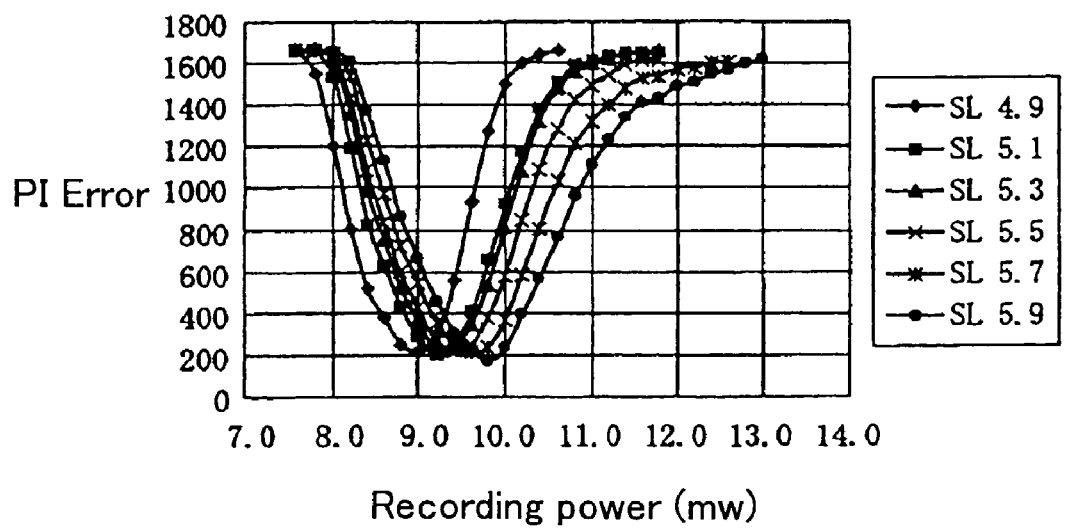
FIG. 32 is a diagram showing changes of the error rate that were measured when an offset signal was manually added to the slice level signal.

Next, measurement was made on changes in the jitter (σ/Tw) and the error rate when an offset signal was manually added to the slice level signal. Here, the slice offset value was set at a constant value, regardless of recording conditions. The results are shown in FIGS. 31 and 32. The numerical values shown as examples in FIGS. 31 and 32 represent offset dial values added to the slice level signal.

As can be seen from the results, the range of recording power with which the error rate becomes lowest can be changed by adding an offset signal to the slice level signal. This confirms that excellent reproduction can be carried out with a low error rate, even where the recording conditions are not optimum, or where optimum recording has not been carried out for the reproducing device, i.e., the jitter is not showing a preferable value for the information reproducing device carrying out the reproduction.

Figure 33:
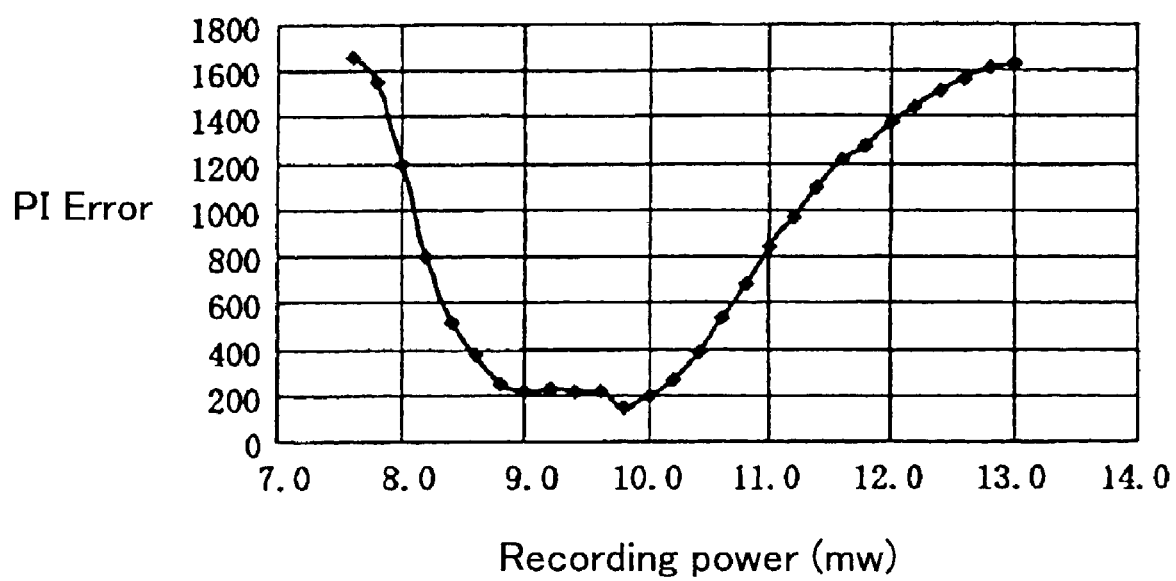
FIG. 33 is a diagram showing changes of the error rate that were measured when an offset signal was automatically added to the slice level signal so that the slice level signal could match with the amplitude center value of the shortest mark.
Figure 34:
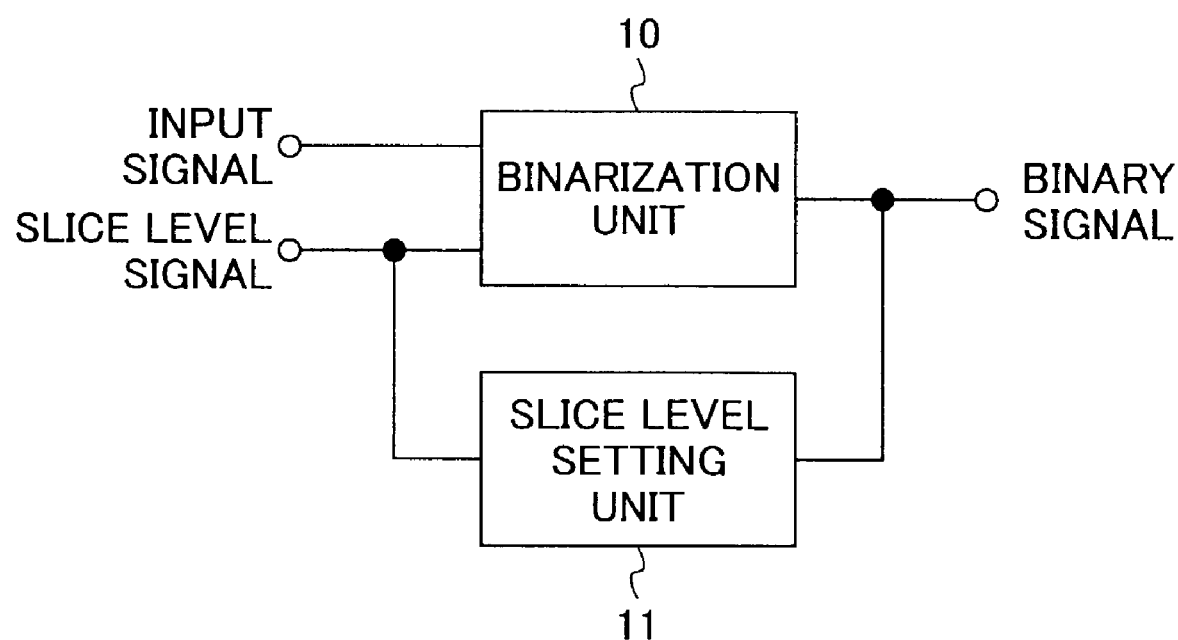
FIG. 34 shows the structure of an auto slice circuit that is an example of a conventional binarization device.
Figure 35:
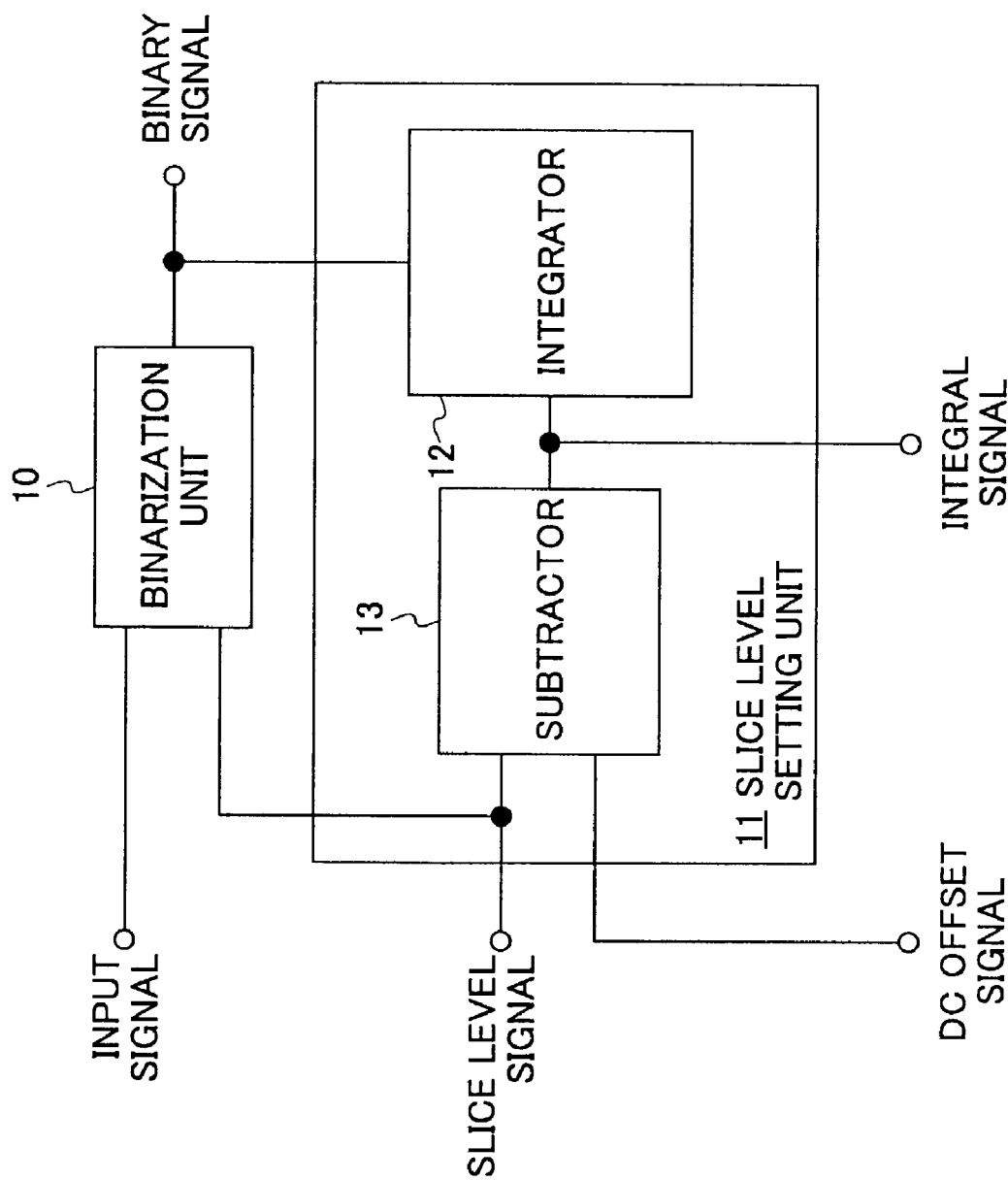
FIG. 35 is a circuit diagram showing an example of the inner structure of the slice level setting unit 11 of the conventional auto slice circuit shown in FIG. 34.
Figure 36A:
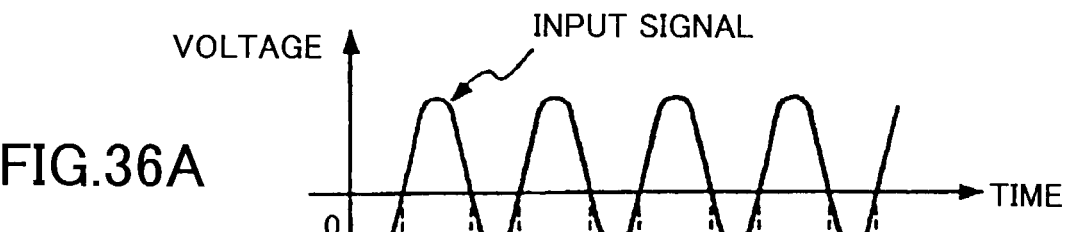
FIG. 36A is a waveform chart of the input signal to be input into the binarization unit 10 of the auto slice circuit shown in FIG. 35.
Figure 36B:
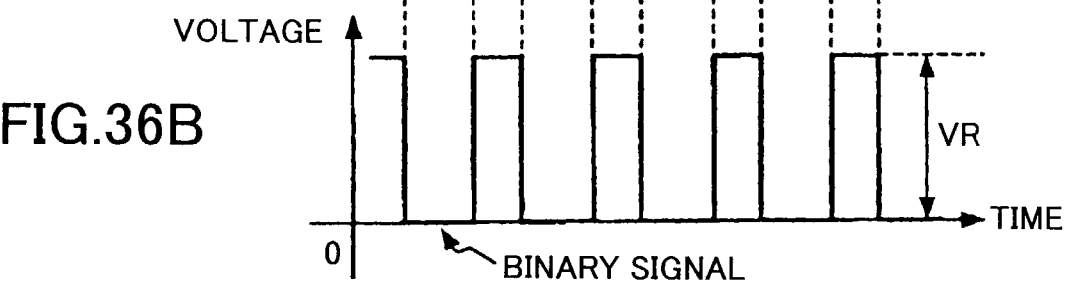
FIG. 36B is a waveform chart of the binary signal to be output from the binarization unit 10.
Figure 36C:
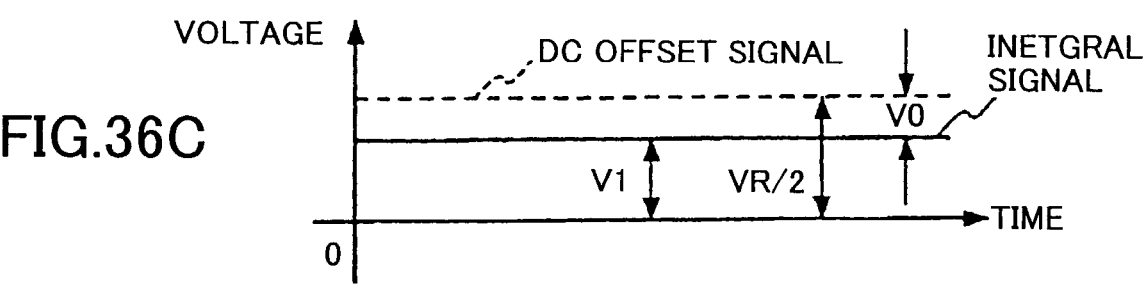
FIG. 36C is a waveform chart of the integral signal to be output from the integrator 12 of the auto slice circuit shown in FIG. 35.
Figure 36D:
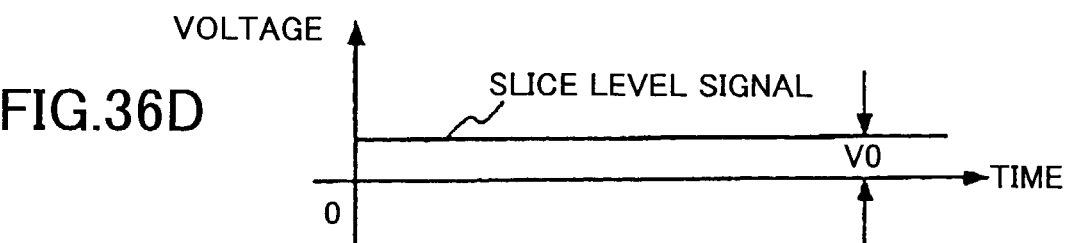
FIG. 36D is a waveform chart of the slice level signal to be output from the subtractor 13 of the auto slice circuit shown in FIG. 35.
Figure 36E:
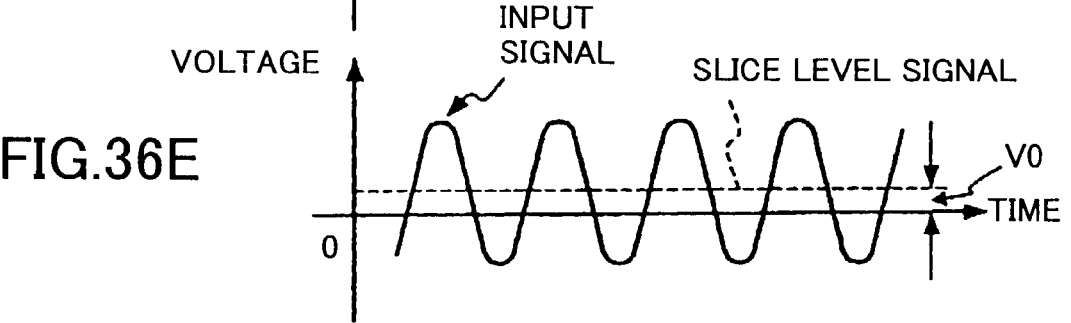
FIG. 36E is a waveform chart of the input signal and the slice level signal to be input into the binarization unit 10 of FIG. 35.
Figure 37:
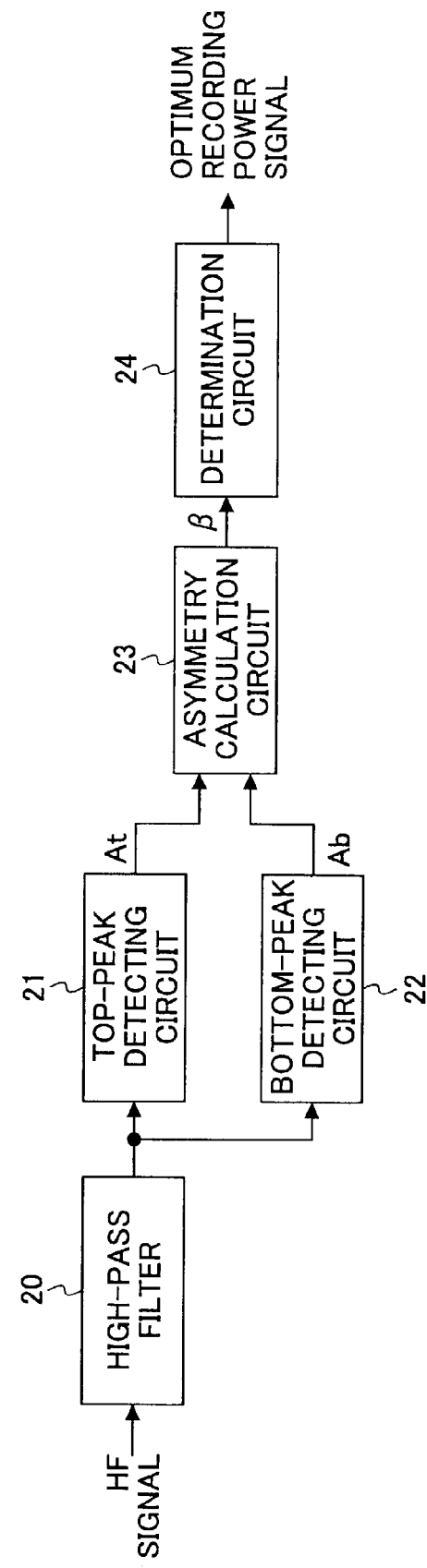
FIG. 37 is a block diagram showing the structure of a conventional circuit that detects the asymmetry of a reproduction signal obtained by reproducing a test signal recorded with varied recording power, and determines the optimum recording power from the asymmetry.
Figure 38:
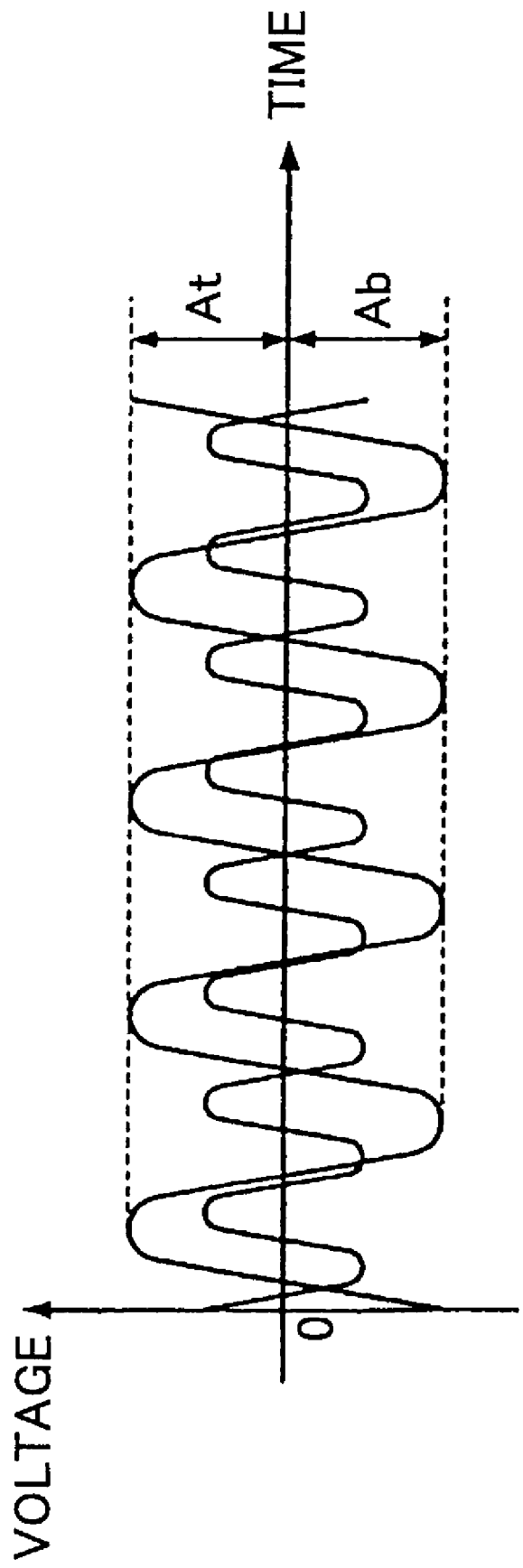
FIG. 38 is a waveform chart of the output signal of the high-pass filter 20 of the circuit shown in FIG. 37.

Next, the recorded area in which the random pattern had been recorded with varied recording power was reproduced by the information reproducing device equipped with the auto slice circuit shown in FIG. 3, i.e., the information reproducing device in which the shortest mark amplitude center detecting unit 5 detects the amplitude center value of the shortest mark in the input signal to be input into the binarization unit 1, and the offset setting unit 6 adds an offset signal to the slice level so that the amplitude center value substantially matches with the signal output from the slice level setting unit 2. As shown in FIG. 33, the results confirmed that excellent reproduction could be carried out with a very low error rate over a wide range of recording power.

It should be noted that the present invention is not limited to the embodiments specifically disclosed above, but other variations and modifications may be made without departing from the scope of the present invention.

What is claimed is:

1. A binarization device comprising:
   a binarization unit that binarizes a reproduction signal obtained by reproducing information recorded by mark length recording on a recording medium to obtain high-level signals and low-level signals based on a slice level;
   a slice level setting unit that calculates the average value of the high-level signals output from the binarization unit, further calculates the slice level based on the average value, and sets the slice level to the binarization unit; and a weight adding means of adding a predetermined weight to each signal having a short high-level time among the high-level signals.

2. The binarization device as claimed in claim 1, wherein the weight adding means serves to decrease the level value of each of the high-level signals with a lapse of output time.

3. The binarization device as claimed in claim 1, wherein the weight adding means serves to give a level value to each signal having a short high-level time in such a manner that the shorter high-level time a signal has, the greater level value the signal is given.

4. The binarization device as claimed in claim 1, wherein a fluctuation of the slice level is made greater than a fluctuation of the center value of amplitude of the second shortest mark length in the reproduction signal.

5. The binarization device as claimed in claim 1, wherein the weight adding means adds a predetermined weight to each signal having a short high-level time, so that curves representing recording mark length dependencies of the differences among mark lengths and space lengths recorded on the recording medium cross between the shortest mark length and the second shortest mark length.

6. The binarization device as claimed in claim 1, further comprising:
   an amplitude center value detecting unit that detects the amplitude center value of the shortest mark length in the reproduction signal; and
   a slice offset adding unit that adds a slice offset value to the slice level determined by the slice level setting unit, so that the slice level to be set to the binarization unit matches with the amplitude center value detected by the amplitude center value detecting unit.

7. The binarization device as claimed in claim 1, wherein the recording medium has physical change parts that are formed in two non-recording areas between which a track having marks recorded thereon is located, with the center line of the track being the center line of the asymmetrical situation of the physical change parts.

8. A binarization device comprising:
   a binarization unit that binarizes a reproduction signal obtained by reproducing information recorded by mark length recording on a recording medium to output high-level signals that are above a slice level and low-level signals that are below the slice level, and further binarizes the reproduction signal to output low-level signals that are above the slice level and high-level signals that are below the slice level;

a slice level setting unit that calculates the average value of the former high-level signals and the average value of the latter high-level signals, further calculates the average value of the former high-level signal average value and the latter high-level signal average value, determines the slice level from the last average value, and sets the slice level to the binarization unit; and a weight adding means of adding a predetermined weight to each signal having a short high-level time among all the high-level signals.

9. A binarization device comprising:

a binarization unit that binarizes a reproduction signal obtained by reproducing information recorded by mark length recording on a recording medium to output high-level signals that are above a slice level and low-level signals that are below the slice level, and further binarizes the reproduction signal to output low-level signals that are above the slice level and high-level signals that are below the slice level;

a slice level setting unit that calculates the average value of the former high-level signals and the average value of the latter high-level signals output from the binarization unit, selects one of the two average values based on the condition of the reproduction signal, calculates the slice level from the selected average value, and sets the slice level to the binarization unit; and a weight adding means of adding a predetermined weight to each signal having a short high-level time among all the high-level signals.

* * * * *